United States Patent
Edge et al.

(10) Patent No.: US 12,207,160 B2
(45) Date of Patent: Jan. 21, 2025

(54) SYSTEMS AND METHODS FOR SUPPORTING A LOCATION UNCERTAINTY FOR A SCHEDULED LOCATION

(71) Applicant: QUALCOMM Incorporated, San Diego, CA (US)

(72) Inventors: Stephen William Edge, Escondido, CA (US); Sven Fischer, Nuremberg (DE)

(73) Assignee: QUALCOMM Incorporated, San Diego, CA (US)

(*) Notice: Subject to any disclaimer, the term of this patent is extended or adjusted under 35 U.S.C. 154(b) by 340 days.

(21) Appl. No.: 17/739,132

(22) Filed: May 8, 2022

(65) Prior Publication Data
US 2022/0360943 A1  Nov. 10, 2022

Related U.S. Application Data

(60) Provisional application No. 63/186,163, filed on May 9, 2021.

(51) Int. Cl.
*H04W 4/029* (2018.01)
*G01S 5/00* (2006.01)
*G01S 5/02* (2010.01)

(52) U.S. Cl.
CPC .......... *H04W 4/029* (2018.02); *G01S 5/0027* (2013.01); *G01S 5/0244* (2020.05)

(58) Field of Classification Search
None
See application file for complete search history.

(56) References Cited

U.S. PATENT DOCUMENTS

2024/0085517 A1* 3/2024 Duan ............... H04W 4/026
2024/0172170 A1* 5/2024 Manolakos ......... H04W 64/00

FOREIGN PATENT DOCUMENTS

WO   WO-2005111652 A1   11/2005
WO   WO-2018194758 A1   10/2018
WO   WO-2020132080 A2   6/2020

OTHER PUBLICATIONS

International Search Report and Written Opinion—PCT/US2022/028286—ISA/EPO—Aug. 1, 2022.

* cited by examiner

*Primary Examiner* — Kenneth B Wells
(74) *Attorney, Agent, or Firm* — QUALCOMM Incorporated

(57) ABSTRACT

The location of a user equipment (UE) is determined at a scheduled location time based on location measurements for the UE received from one or more other entities. The location measurements are obtained at a plurality of times based on the scheduled location time. An uncertainty of the location that indicates a difference between the location and an actual location of the UE at the scheduled location time is determined and the location and the uncertainty of the location are sent to a requesting entity. The uncertainty of the location is based on a location uncertainty and a time uncertainty relative to the scheduled location time, which are combined into a single location uncertainty.

29 Claims, 7 Drawing Sheets

SYSTEMS AND METHODS FOR SUPPORTING A LOCATION UNCERTAINTY FOR A SCHEDULED LOCATION

CROSS-REFERENCE TO RELATED APPLICATIONS

This application claims the benefit of U.S. Provisional Application No. 63/186,163, entitled "SYSTEMS AND METHODS FOR SUPPORTING A COMBINED LOCATION AND TIME UNCERTAINTY FOR SCHEDULED LOCATION," filed May 9, 2021, which is assigned to the assignee hereof and which is expressly incorporated herein by reference in its entirety.

BACKGROUND

Field

Subject matter disclosed herein relates to location determination for a mobile device and more particularly to supporting location of a mobile device using a scheduled location time.

Relevant Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., LTE or WiMax). A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor.

Obtaining the location of a mobile device that is accessing a wireless (e.g. 5G) network may be useful for many applications including, for example, emergency calls, personal navigation, asset tracking, locating a friend or family member, etc. However, in many applications it is desirable to reduce latency. There are many components in the positioning process that contribute to latency. One way to reduce latency is use of a scheduled location time, which may allow a location services (LCS) client to specify a precise future time at which a location of a user equipment (UE) is to be obtained. The use of a scheduled location time, however, may introduce additional uncertainties in the location of a UE, which it is desirable to control or reduce.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

The location of a user equipment (UE) is determined at a scheduled location time T based on location measurements for the UE received from one or more other entities. The location measurements are obtained at a plurality of times based on the scheduled location time. An uncertainty of the location that indicates a difference between the location and an actual location of the UE at the scheduled location time is determined and the location and the uncertainty of the location are sent to a requesting entity. The uncertainty is based on a location uncertainty and a time uncertainty, which are combined into a single location uncertainty.

In one implementation, a method at an entity for locating a UE at a scheduled location time, includes receiving location measurements for the UE from one or more other entities, the location measurements obtained by the one or more other entities at a plurality of times within a time period that includes the scheduled location time; determining a location for the UE based on the location measurements; determining an uncertainty of the location, wherein the uncertainty indicates a difference between the location and an actual location of the UE at the scheduled location time; and sending the location and the uncertainty of the location to another entity.

In one implementation, an entity in a wireless network configured for locating a UE at a scheduled location time, includes an external interface configured to communicate with other entities in the wireless network; at least one memory; and at least one processor coupled to the external interface and the at least one memory and configured to: receive location measurements for the UE from one or more other entities, the location measurements obtained by the one or more other entities at a plurality of times within a time period that includes the scheduled location time; determine a location for the UE based on the location measurements; determine an uncertainty of the location, wherein the uncertainty indicates a difference between the location and an actual location of the UE at the scheduled location time; and send the location and the uncertainty of the location to another entity.

In one implementation, an entity in a wireless network configured for locating a user equipment (UE) at a scheduled location time, includes means for receiving location measurements for the UE from one or more other entities, the location measurements obtained by the one or more other entities at a plurality of times within a time period that includes the scheduled location time; means for determining a location for the UE based on the location measurements; means for determining an uncertainty of the location, wherein the uncertainty indicates a difference between the location and an actual location of the UE at the scheduled location time; and means for sending the location and the uncertainty of the location to another entity.

In one implementation, a non-transitory storage medium including program code stored thereon, the program code is operable to configure at least one processor in an entity in a wireless network for locating a user equipment (UE) at a scheduled location time, the program code comprising instructions to: receive location measurements for the UE from one or more other entities, the location measurements obtained by the one or more other entities at a plurality of times within a time period that includes the scheduled location time; determine a location for the UE based on the location measurements; determine an uncertainty of the location, wherein the uncertainty indicates a difference between the location and an actual location of the UE at the scheduled location time; and send the location and the uncertainty of the location to another entity.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
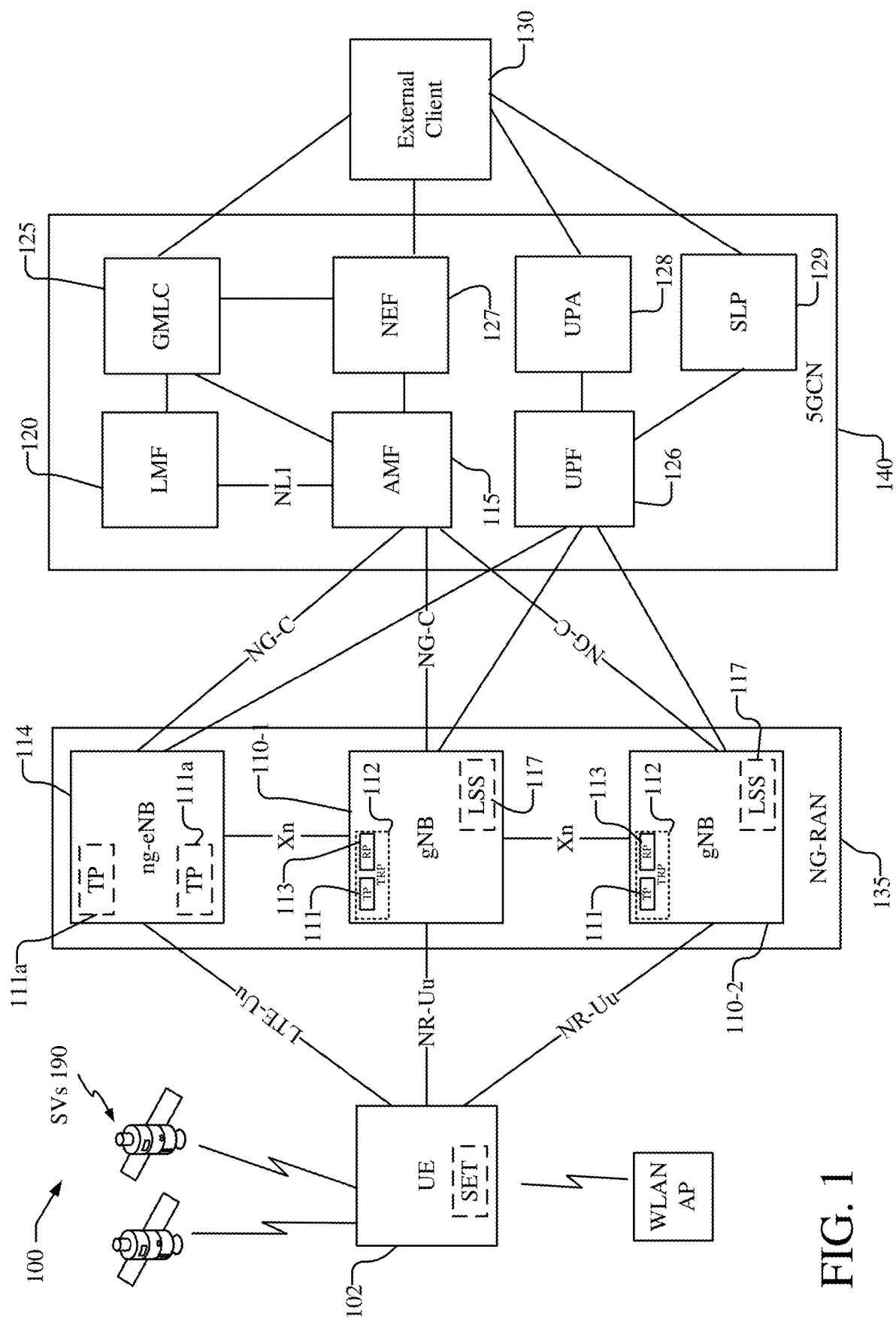
FIG. 1 illustrates a wireless communication system including a Next Generation (NG) Radio Access Network.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 110-1 and 110-2 of a gNB are shown in FIG. 1. A reference to a gNB 110 may then refer to any of gNBs 110-1 and 110-2.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, Industrial IoT (IIoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.).

As used herein the term traffic channel (TCH) can refer to either an UL/reverse or DL/forward traffic channel.

The term "base station" may refer to a single physical transmission reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The LS may be part of or accessible from a serving network or a home network for a UE or may simply be accessible over the Internet or over a local Intranet. If positioning of a UE is needed, an LS may instigate a session (e.g. a location session or a SUPL session) with the UE and coordinate location measurements by the UE and determination of an estimated location of the UE. During a location session, an LS may request positioning capabilities of the UE (or the UE may provide them without a request), may provide assistance data to the UE (e.g. if requested by the UE or in the absence of a request) and may request a location estimate or location measurements from a UE, e.g. for the Global Navigation Satellite System (GNSS), Assisted GNSS (A-GNSS), Time Difference of Arrival (TDOA), Angle of Departure (AOD), Angle of Arrival (AOA), Round Trip Time (RTT), multi-cell RTT, or a combination thereof or other position methods. Assistance data may be used by a UE to acquire and measure GNSS and/or positioning reference signal (PRS) signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AOD, Multi-RTT, etc.).

In a UE assisted mode of operation, a UE may return location measurements to an LS which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AOD, Multi-RTT, etc.).

In some scenarios, a UE, a location services (LCS) Client or application function (AF) that is requesting the location of a target UE may know a time at which the location should be obtained. For example, with a periodic deferred Mobile Terminated Location Request (MT-LR), the location of a UE is obtained at fixed periodic intervals, and thus, the location time is known in advance. In another example, such as in a factory or warehouse with moving tools, components, packages etc., there may be a precise expectation of a specific time when a moving tool, component or package etc. will reach a specific location or will have completed a specific movement or operation. In such a scenario, it may then be useful or critical to locate the tool, component or package etc. to confirm the expectation of location at the specific time and make any further adjustments. Further, the location of UEs may sometimes be scheduled to occur at specific times in the future. For example, vehicles on a road may all be located at the same time to provide an indication of traffic congestion as well as to assist with communications and safety. Likewise, people, containers, transportation systems etc., may also be located at certain common times. In scenarios such as these, the time at which the location(s) should be obtained, which may be referred to as a scheduled location time, may be provided in advance in order to obtain the location(s) at exactly the required time and/or to reduce the effective latency in providing the location results to the recipient UE(s), LCS Client(s) or AF(s).

As discussed above, a scheduled location time allows an external LCS Client, AF or a UE to specify a time in the future at which a location of the UE is to be obtained. The location of the UE at precisely the scheduled location time is normally the objective, although there can be an allowance in LCS quality of service (QoS) for some uncertainty or error in achieving the scheduled location time. The uncertainty or error may include multiple sources of error. For example, the uncertainty may include a location uncertainty which reflects the difference between the estimated location of the target UE at the time of measurement and the actual location of the target UE at the time of measurement. Another source of uncertainty may be a time uncertainty which is due to a difference between a time of measurement and the scheduled location time. For example, if a location request for a UE includes a scheduled location time T, a location measurement for the UE may occur at a slightly different time T1. The UE may be at a location L at the time T and at a slightly different location L1 at the time T1, and the estimated location for the UE at the time T1 may be a location L1'. The location uncertainty (or measurement uncertainty) or error can then be expressed as L1−L1' (e.g. where vector subtraction may be used if L1 and L1' are each vectors or where subtraction of corresponding coordinates may be used if L1 and L1' each comprise either X and Y coordinates or X, Y and Z coordinates according to some Cartesian coordinate system). The time uncertainty or error can be similarly expressed as T−T1. Thus, the overall uncertainty or error includes the location error L1−L1' and the time error T−T1. If the UE is moving at a constant speed V, the time error would cause a corresponding additional location error of V*(T−T1). Thus, the effect of the time error may be significant if the UE is moving and if a very accurate location is needed. However, an LCS client, AF or the UE may not be able to determine a level of significance for the time error, e.g. may not be able to determine whether a returned location is still useful and usable.

It may be desirable to combine location uncertainty and time uncertainty into a single combined location uncertainty that expresses the combined errors of both types of uncertainty. The combination, for example, can be performed if a location server has information on UE motion (e.g. a velocity), or if UE location measurements are obtained both shortly before and shortly after the scheduled location time. A combined location uncertainty may avoid the need for an LCS Client to know anything about a time error. The combined uncertainty can express the expected (or possible) difference between the actual location of the UE at the scheduled location time and the location obtained for the UE which may correspond to a time slightly different to the scheduled location time. The end result can be to simplify use of a scheduled location time from an LCS Client perspective.

FIG. 1 shows a positioning architecture diagram of a communication system 100 that may support scheduling location in advance of when it is needed (scheduled location time) and use of the combination of location uncertainty and time uncertainty, as well as use of location management functionality in an NG-RAN. The location management functionality in the NG-RAN may be a "Location Server Surrogate (LSS)" or a "Location Management Component (LMC)" and is in one or more of the gNBs 110 in FIG. 1 or may be external to the gNBs 110 but within the NG-RAN 135. It is noted that an LMC or LSS is an optional element that may not always be present.

The communication system 100 may be configured for supporting location of a user equipment (UE) 102. Here, the communication system 100 comprises a UE 102, and components of a Fifth Generation (5G) network comprising a Next Generation (NG) Radio Access Network (RAN) (NG-RAN) 135 and a 5G Core Network (5GCN) 140. A 5G network may also be referred to as a New Radio (NR) network; NG-RAN 135 may be referred to as a 5G RAN or as an NR RAN; and 5GCN 140 may be referred to as an NG Core network (NGC). The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted, as necessary. Specifically, although only one UE 102 is illustrated, it will be understood that many UEs (e.g., hundreds, thousands, millions, etc.) may utilize the communication system 100. Similarly, the communication system 100 may include a larger (or smaller) number of SVs 190, gNBs 110, next generation evolved Node Bs (ng-eNBs) 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology or for other communication technologies and protocols) may be used to configure, in response to receiving a request, an increased quantity of location-related information or resources associated with broadcast communication from wireless nodes (e.g. broadcast of assistance data), transmission of Positioning Reference Signals (PRSs) or some other location related function of the wireless nodes.

The UE 102 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 102 may correspond to a cellphone, smartphone, laptop, tablet, PDA, tracking device, navigation device, Internet of Things (IoT) device, or some other portable or moveable device. Typically, though not necessarily, the UE 102 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 135 and 5GCN 140), etc. The UE 102 may also support wireless communication using a Wireless Local Area Network (WLAN) which may connect to other networks (e.g. the Internet) using a Digital Subscriber Line (DSL) or packet cable for example. The use of one or more of these RATs may allow the UE 102 to communicate with an external client 130 (via elements of 5GCN 140 not shown in FIG. 1, or possibly via a Gateway Mobile Location Center (GMLC) 125) and/or allow the external client 130 to receive location information regarding the UE 102 (e.g., via the GMLC 125).

The UE 102 may include a single entity or may include multiple entities such as in a personal area network where a user may employ audio, video and/or data I/O devices and/or body sensors and a separate wireline or wireless modem. An estimate of a location of the UE 102 may be referred to as a location, location estimate, location fix, fix, position, position estimate or position fix, and may be geodetic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of the UE 102 may also be expressed as an area or volume (defined either geodetically or in civic form) within which the UE 102 is expected to be located with some probability or confidence level (e.g., 67%, 95%, etc.) A location of the UE 102 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1 comprise NR NodeBs, also referred to as gNBs, 110-1 and 110-2 (collectively and generically referred to herein as gNBs 110). Pairs of gNBs 110 in NG-RAN 135 may be connected to one another—e.g. directly as shown in FIG. 1 or indirectly via other gNBs 110. Access to the 5G network is provided to UE 102 via wireless communication between the UE 102 and one or more of the gNBs 110, which may provide wireless communications access to the 5GCN 140 on behalf of the UE 102 using 5G NR. 5G NR radio access may also be referred to as NR radio access or as 5G radio access. In FIG. 1, the serving gNB for UE 102 is assumed to be gNB 110-1, although other gNBs (e.g. gNB 110-2) may act as a serving gNB if UE 102 moves to another location or may act as a secondary gNB to provide additional throughout and bandwidth to UE 102. An optionally present Location Server Surrogate (LSS) 117 within a node in the NG-RAN 135, such as in serving gNB 110-1, may perform a location server function, as discussed herein.

Base stations (BSs) in the NG-RAN 135 shown in FIG. 1 may also or instead include a next generation evolved Node B, also referred to as an ng-eNB, 114. Ng-eNB 114 may be connected to one or more gNBs 110 in NG-RAN 135—e.g. directly or indirectly via other gNBs 110 and/or other ng-eNBs. An ng-eNB 114 may provide LTE wireless access and/or evolved LTE (eLTE) wireless access to UE 102. Some gNBs 110 (e.g. gNB 110-2) and/or ng-eNB 114 in FIG. 1 may be configured to function as positioning-only beacons, which may transmit signals (e.g. PRS signals) and/or may broadcast assistance data to assist positioning of UE 102 but may not receive signals from UE 102 or from other UEs. It is noted that while only one ng-eNB 114 is shown in FIG. 1, some embodiments may include multiple ng-eNBs 114.

A location server in FIG. 1 may correspond to, e.g., Location Management Function (LMF) 120, Secure User Plane Location (SUPL) Location Platform (SLP) 129 in the 5GCN 140, a Location Server Surrogate (LSS) 117 (or a Location Management Component (LMC)) in the NG-RAN 135, or a gNB 110. Such a location server may be capable of providing positioning assistance data to UE 102 including, for example, information regarding signals to be measured (e.g., expected signal timing, signal coding, signal frequencies, signal Doppler), locations and identities of terrestrial transmitters (e.g. gNBs 110) and/or signal, timing and orbital information for GNSS SVs to facilitate positioning techniques such as A-GNSS, AFLT, AOD, downlink (DL) TDOA, RTT, and ECID. The facilitation may include improving signal acquisition and measurement accuracy by UE 102 and, in some cases, enabling UE 102 to compute its estimated location based on the location measurements. For example, a location server (e.g. LMF 120 or SLP 129) may have access to an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g. a gNB) such as transmission power and signal timing. A UE 102 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (Rx-Tx), or a round trip signal propagation time (RTT) between UE 102 and a cellular transceiver (e.g. a gNB) or a local transceiver (e.g. a WiFi access point (AP)). A UE 102 may use these measurements together with assistance data (e.g. terrestrial almanac data or GNSS satellite data such as GNSS Almanac and/or GNSS Ephemeris information) received from a location server (e.g. LMF 120 or SLP 129) or broadcast by a base station (e.g. a gNB 110-1, 110-2) in NG-RAN 135 to determine a location for UE 102.

As noted, while FIG. 1 depicts nodes configured to communicate according to 5G NR and LTE communication protocols for an NG-RAN 135, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 102, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1.

The gNBs 110 and ng-eNB 114 can communicate with an Access and Mobility Management Function (AMF) 115, which, for positioning functionality may communicate with a Location Management Function (LMF) 120. The AMF 115 may support mobility of the UE 102, including cell change and handover and may participate in supporting a signaling connection to the UE 102 and possibly data and voice bearers for the UE 102. The LMF 120 may support scheduling for positioning of the UE 102 when the UE accesses the NG-RAN 135 and may support position procedures/methods such as Assisted GNSS (A-GNSS), Downlink Time Difference of Arrival (DL-TDOA), Multi-Cell RTT, Real Time Kinematic (RTK), Precise Point Positioning (PPP), Differential GNSS (DGNSS), Enhanced Cell ID (ECID), angle of arrival (AOA), angle of departure (AOD), and/or other positioning procedures. The LMF 120 may also process location services requests for the UE 102, e.g., received from the AMF 115 or from the GMLC 125. The LMF 120 may be connected to AMF 115 and/or to GMLC 125. In some embodiments, a node/system that implements the LMF 120 may additionally or alternatively implement other types of location-support modules, such as an Enhanced Serving Mobile Location Center (E-SMLC). It is noted that in some embodiments, at least part of the positioning functionality (including derivation of a UE 102's location) may be performed at the UE 102 (e.g., using signal measurements obtained by UE 102 for signals transmitted by wireless nodes such as gNBs 110 and ng-eNB 114, and assistance data provided to the UE 102, e.g. by LMF 120). In the case of OMA SUPL location, the location server may be a SUPL Location Platform (SLP) such as SLP 129 as opposed to the LMF 120.

The Gateway Mobile Location Center (GMLC) 125 may support a location request for the UE 102 received from an external client 130 and may forward such a location request to the AMF 115 for forwarding by the AMF 115 to the LMF 120 or may forward the location request directly to the LMF 120. A location response from the LMF 120 or an LSS 117 (e.g. containing a location estimate for the UE 102) may be returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1 though only one of these connections may be supported by 5GC 140 in some implementations.

The gNB 110-1 may support positioning of the UE 102 when UE 102 accesses the NG-RAN 135. The gNB 110-1 may also process location service requests for the UE 102, e.g., received directly or indirectly from the GMLC 125. In some embodiments, a node/system that implements the gNB 110-1 may additionally or alternatively implement other types of location-support modules, such as an Enhanced Serving Mobile Location Center (E-SMLC) or a Secure User Plane Location (SUPL) Location Platform (SLP) 129. It will be noted that in some embodiments, at least part of the positioning functionality (including derivation of UE 102's location) may be performed at the UE 102 (e.g., using signal measurements for signals transmitted by wireless nodes, and assistance data provided to the UE 102).

To support services including location services from external clients 130 for Internet of Things (IoT) UEs, a Network Exposure Function (NEF) 127 may be included in 5GCN 140. The NEF 127 may support secure exposure of capabilities and events concerning 5GCN 140 and UE 102 to an external client 130 (which may also be referred as an application function (AF)) and may enable secure provision of information from external client 130 to 5GCN 140. In the context of location services, NEF 127 may function to obtain a current or last known location for a UE 102, may obtain an indication of a change in location for a UE 102, or an indication of when a UE 102 becomes available (or reachable). The NEF 127 may be connected to the GMLC 125 to support last known location, current location and/or deferred periodic and triggered location for the UE 102. If desired, the NEF 127 may include, or may be combined with, the GMLC 125 and may then obtain location information for UE 102 directly from LSS 117 or LMF 120 (e.g. may be connected to the LSS 117 or the LMF 120). NEF 127 may also be connected to AMF 115 to enable NEF 127 to obtain a location for UE 102 directly from the AMF 115.

The User Plane Function (UPF) 126 may support voice and data bearers for UE 102 and may enable UE 102 voice and data access to other networks such as the Internet. UPF 126 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. A location report for UE 102, e.g., including a location estimate determined by the LSS 117 in or attached to the serving gNB 110-1, may be returned by gNB 110-1 to the external client 130 via the UPF 126 and a User Plane Aggregator (UPA) 128 if present. UPF 126 may be connected to SLP 129 to enable support of location of UE 102 using SUPL. SLP 129 may be further connected to or accessible from external client 130.

The UPA 128 is optional and enables an external client 130 to receive location reports for a UE 102 over a user plane by interacting only with the UPA 128. The UPA 128 avoids the need for a gNB 110-1 (or LSS 117) to establish user plane location reporting sessions directly to external clients which may improve security. The UPA 128 may also provide security for the NG-RAN 112 and/or the external client 130 by authenticating and authorizing the external client 130 and/or gNB 110-1 (or LSS 117). The UPA 128 may be part of the 5GCN 140 or may be external to the 5GCN 140 (e.g. may be associated with the external client 130). In some implementations, the UPA 128 may be part of the LMF 120, GMLC 125, or may be connected to the LMF 120 or GMLC 125. A UPA 128 may also be referred to as a router, an IP router, a UP router or as a routing function.

The LMF 120 may communicate with the gNBs 110 and/or with the ng-eNB 114 using a New Radio Position Protocol A (NRPPa), which may be defined in 3GPP Technical Specification (TS) 38.455. NRPPa messages may then be transferred between a gNB 110 and the LMF 120, and/or between an ng-eNB 114 and the LMF 120, via the AMF 115. LMF 120 and UE 102 may communicate using an LTE Positioning Protocol (LPP), which may be defined in 3GPP TS 37.355. Here, LPP messages may be transferred between the UE 102 and the LMF 120 via the AMF 115 and a serving gNB 110-1 or serving ng-eNB 114 for UE 102. For example, LPP messages may be transferred between the LMF 120 and the AMF 115 using the Hypertext Transfer Protocol (HTTP) and may be transferred between the AMF 115 and the UE 102 using a 5G Non-Access Stratum (NAS) protocol. The LPP protocol may be used to support positioning of UE 102 using UE assisted and/or UE based position methods such as A-GNSS, RTK, DL-TDOA, Multi-cell RTT, and/or ECID. The NRPPa protocol may be used to support positioning of UE 102 using network based or network associated position methods such as ECID, AOA and multi-cell RTT (e.g. to enable measurements to be obtained by a gNB 110 or ng-eNB 114) and/or may be used by LMF 120 to obtain location related information from gNBs 110 and/or ng-eNB 114, such as parameters defining PRS transmission from gNBs 110 and/or ng-eNB 114.

With a UE assisted position method, UE 102 may obtain location measurements and send the measurements to a location server (e.g. LMF 120, SLP 129, or an LSS 117 (or LMC) within a node in the NG-RAN 135, such as in serving gNB 110-1) for computation of a location estimate for UE 102. For example, the location measurements may include one or more of a Received Signal Strength Indication (RSSI), Round Trip signal propagation Time (RTT), Reference Signal Time Difference (RSTD), receive time-transmission time difference (Rx-Tx), Reference Signal Received Power (RSRP), Reference Signal Received Quality (RSRQ), AOA, and/or AOD for gNBs 110, ng-eNB 114 and/or a WLAN access point (AP). The location measurements may also or instead include measurements of GNSS pseudorange, code phase and/or carrier phase for SVs 190. With a UE based position method, UE 102 may obtain location measurements (e.g. which may be the same as or similar to location measurements for a UE assisted position method) and may compute a location of UE 102 (e.g. with the help of assistance data received from a location server such as LMF 120 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ, AOA or Time Of Arrival (TOA)) for signals transmitted by UE 102, and/or may receive measurements obtained by UE 102, and may send the measurements to a location server (e.g. LMF 120, SLP 129, or an LSS 117 (or LMC) within a node in the NG-RAN 135, such as in serving gNB 110-1) for computation of a location estimate for UE 102.

Information provided by the gNBs 110 and/or ng-eNB 114 to the location server, e.g., LMF 120 using NRPPa or to an LSS 117 within a node in the NG-RAN 135, such as in serving gNB 110-1 using an Xn Application Protocol (XnAP), may include timing and configuration information for PRS transmission and location coordinates. The location server may then provide some or all of this information to the UE 102 as assistance data in an LPP message via the NG-RAN 135 and the 5GC 140.

An LPP message sent from the location server to the UE 102 may instruct the UE 102 to do any of a variety of things, depending on desired functionality. For example, the LPP message could contain an instruction for the UE 102 to obtain measurements for GNSS (or A-GNSS), WLAN, and/or DL-TDOA (or some other position method). In the case of DL-TDOA, the LPP message may instruct the UE 102 to obtain one or more measurements (e.g. RSTD measurements) of PRS signals transmitted within particular cells supported by particular gNBs 110 and/or ng-eNB 114 (or supported by some other type of base station such as an eNB or WiFi AP). An RSTD measurement may comprise the difference in the times of arrival at the UE 102 of a signal (e.g. a PRS signal) transmitted or broadcast by one gNB 110 and a similar signal transmitted by another gNB 110. The UE 102 may send the measurements back to the location server, e.g., to the LMF 120 in an LPP message (e.g. inside a 5G NAS message) via the serving gNB 110-1 (or serving ng-eNB 114) and the AMF 115, or to the LSS 117 within a node in the NG-RAN 135, such as in serving gNB 110-1.

As noted, while the communication system 100 is described in relation to 5G technology, the communication system 100 may be implemented to support other communication technologies, such as GSM, WCDMA, LTE, etc., that are used for supporting and interacting with mobile devices such as the UE 102 (e.g., to implement voice, data, positioning, and other functionalities). In some such embodiments, the 5GC 140 may be configured to control different air interfaces. For example, in some embodiments, 5GC 140 may be connected to a WLAN, either directly or using a Non-3GPP InterWorking Function (N3IWF, not shown FIG. 1) in the 5GC 140. For example, the WLAN may support IEEE 802.11 WiFi access for UE 102 and may comprise one or more WiFi APs. Here, the N3IWF may connect to the WLAN and to other elements in the 5GCN 140 such as AMF 115. In some other embodiments, both the NG-RAN 135 and the 5GCN 140 may be replaced by other RANs and other core networks. For example, in an EPS, the NG-RAN 135 may be replaced by an E-UTRAN containing eNBs and the 5GCN 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use an LTE Positioning Protocol A (LPPa) in place of NRPPa to send and receive location information to and from the eNBs in the E-UTRAN and may use LPP to support positioning of UE 102. In these other embodiments, on-demand resource allocation for positioning of a UE 102 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

It should be noted that the gNBs 110 and ng-eNB 114 may not always both be present in the NG-RAN 135. Moreover, when both the gNBs 110 and ng-eNB 114 are present, the NG interface with the AMF 115 may only present for one of them.

As illustrated, a gNB 110 may be allowed to control one or more Transmission Points (TPs) 111, such as broadcast-only TPs for improved support of DL position methods such as DL-TDOA or ECID. Additionally, a gNB 110 may be allowed to control one or more Reception Points (RPs) 113, such as internal Location Measurement Units (LMUs) for UL measurements for position methods such as Uplink Time Difference of Arrival (UL-TDOA) or ECID. The TPs 111 and RPs 113 may be combined into, or defined to be part of, a Transmission Reception Point (TRP) 112 to support downlink (DL) and/or uplink (UL) position methods, such as DL-TDOA, UL-TDOA and multi-cell Round Trip signal propagation Time (RTT). Further, a gNB 110 may be allowed to include a Location Server Surrogate (LSS) 117 to support positioning of a target UE 102 by a serving gNB 110. LSS 117 (or LMC) may support some or all of the same functions as LMF 120, with the difference that LSS 117 is located in NG-RAN 135, whereas LMF 120 is located in 5GCN 140. The term "Location Server Surrogate" is used herein for the NG-RAN location management functionality, but other terms may be used, such as "Local-LMF" or "NG-RAN LMF," etc. Positioning of a UE 102 by a serving gNB 110 can be used to provide a location service to a UE 102, serving AMF 115 or LMF 120 and to improve NG-RAN operation—e.g. by reducing the latency of position determination and increasing the number of UEs 102 for which location can be supported.

As illustrated, the ng-eNB 114 may control one or more TPs 111a, which may use different protocols than TPs 111 in gNBs 110-1 and 110-2, e.g., the TPs 111a may use protocols related to LTE, while TPs 111 use protocols related to 5G NR. The TPs 111a may perform similar functions as TPs 111 in gNBs 110-1 and 110-2, and accordingly, TPs 111 and 111a may be collectively referred to herein as TPs 111.

The location management functionality in the NG-RAN 135, i.e., LSS 117, may have comparable capability to a 5GCN LMF, e.g., LMF 120). An operator could restrict an LSS 117 to support scheduling of e.g., NR Radio Access Technology (RAT) dependent positioning. The LSS 117, if present, may communicate with a gNB Central Unit (gNB-CU) and may support position determination and reporting, as described later. The LMF 120 may manage the scheduling for one or more Transmission Points (TPs) 111 that are configured to transmit downlink (DL) reference signals (RSs) to be measured by the UE 102 and one or more Reception Points (RPs) 113 that are configured to receive and measure uplink (UL) Resource Signals (RSs) transmitted by the UE 102, as well as the UL transmissions by the UE 102.

The LMF 120, SLP 129, and the LSS 117 (or LMC) in a gNB 110 may perform various functions. For example, the LMF 120 (or SLP 129) may request location measurements from the UE 102, e.g., using RRC or LPP, and may manage UL location measurements by the gNB 110 or TRP 112 of the UE 102, and may manage static and dynamic scheduling of DL-PRS and broadcast of assistance data by the gNB 110. The LMF 120 (or SLP 129) may further interact with other gNBs 110 to coordinate location support (e.g. obtain UL location measurements for a UE 102 or request changes to DL-PRS broadcast). The LSS 117 may receive the location measurements and may determine a location estimate for a UE 102. The above functions are provided as examples only. Additional or different functions may be performed if desired. An LSS 117 may communicate with other gNBs 110 using XnAP or a location specific protocol above XnAP in order to coordinate support of these functions.

Thus, an LSS 117 may support NG-RAN 135 determination of a UE 102 location which can be requested by the UE 102 (e.g., using LPP), by a serving AMF 115 (e.g., using NGAP or a location specific protocol conveyed by NGAP), by another gNB 110/ng-eNB 114 (e.g. using XnAP or a location specific protocol conveyed by XnAP), or the LMF 120 (e.g., using NRPPA protocol). Such a capability would allow location support with reduced latency in position determination (since the NG-RAN 135 is closer to a UE 102 than an LMF 120) and offload location support from LMFs.

Figure 2:
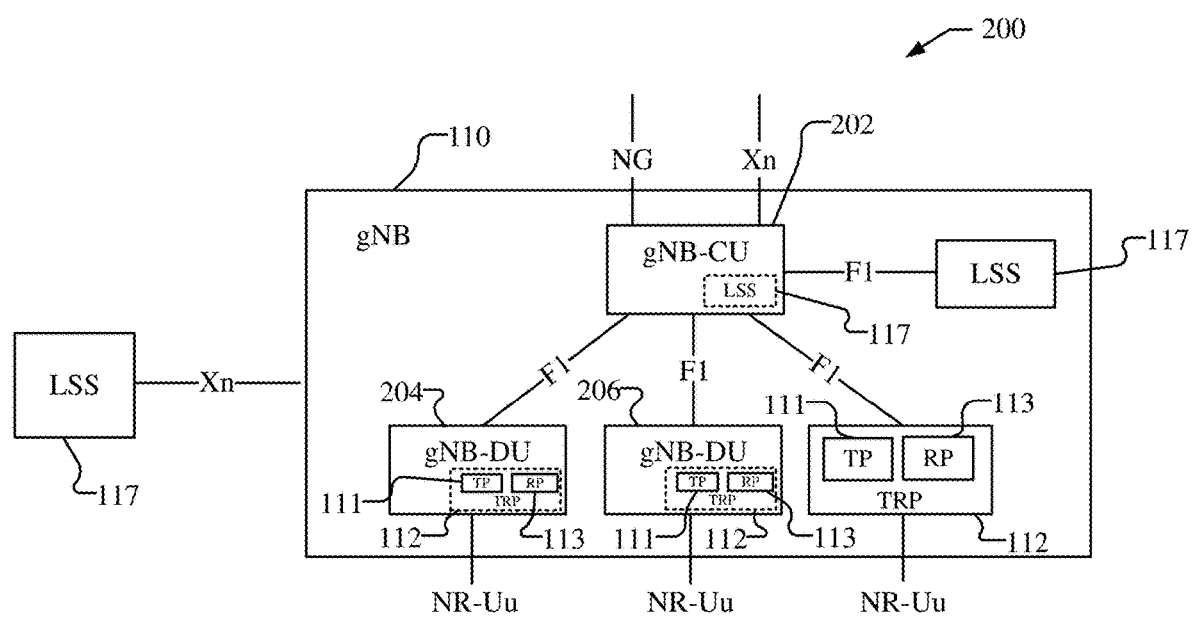
FIG. 2 shows an extended architecture diagram of an NG-RAN node that includes a Location Server Surrogate (LSS).

FIG. 2 shows an architecture diagram of an NG-RAN node 200, which may include an LSS 117 or may be coupled to an LSS 117 that is within the NG-RAN, e.g., as a separate entity or as part of another gNB. The NG-RAN node 200 may be a gNB 110, according to one implementation. The architecture shown in FIG. 2, for example, may be applicable to any gNB 110-1 and 110-2 in NG-RAN 135 shown in FIG. 1.

As illustrated, gNB 110 includes a gNB Central Unit (gNB-CU) 202, and gNB Distributed Units (gNB-DUs) 204 and 206, which may be physically co-located in the gNB 110 or may be physically separate. The gNB-CU 202 is a logical or physical node hosting support for RRC, SDAP and PDCP protocols of the gNB used over the NR Uu air interface and controlling the operation of one or more gNB-DUs. The gNB-CU terminates the F1 interface connected with the gNB-DU. As illustrated, the gNB-CU 202 may communicate with an AMF 115 via an NG interface. The gNB-CU 202 may further communicate with one or more other gNBs 110 via the Xn interface. The gNB-DUs 204 and 206 are logical or physical nodes hosting support for RLC, MAC and PHY protocol layers used over the NR Uu air interface of the gNB 110, operation of which is partly controlled by gNB-CU 202. The gNB-DU terminates the F1 interface connected with the gNB-CU. The gNB-CU 202 requests positioning measurements (e.g. E-CID) to the gNB-DU 204 and 206. The gNB-DU 204 and 206 reports the measurements back to the gNB-DU 202. A gNB-DU 204 or 206 may include positioning measurement functionality. It should be understood that a separate measurement node is not precluded.

The LSS 117 can be part of a gNB-CU 202 (e.g. a logical function of a gNB-CU 202). However, in order to offload positioning support from a gNB-CU 202 and to allow a multi-vendor environment, a separate LSS 117 is allowed, which may be connected to the gNB-CU 202 via an F1 interface. Additionally or alternatively, an LSS 117 within the NG-RAN 135 may be external to the gNB 110, e.g., as part of another gNB, and may be connected to the gNB 110 via an Xn interface. The gNB-CU 202 can then forward all positioning related signaling to the LSS 117 and/or gNB-DUs 204 and 206 or TRPs 112.

Additionally, as illustrated, gNB 110 may include a TP 111 and an RP 113 combined into a TRP 112, and LSS 117, which may be physically or logically located in the gNB 110. The gNB-CU 202 may be configured to communicate with the TP 111, RP 113, and LSS 117, e.g., via F1 interfaces.

The gNB-CU 202, thus, controls one or more TP 111 and RP 113 and the LSS 117 is accessible from the gNB-CU 202 via an F1 interface.

In some embodiments, the NG-RAN node 200 (or gNB 110) may comprise a subset of the elements shown in FIG. 2. For example, the NG RAN node 200 may comprise the gNB-CU 202 and the LSS 117 but may not include one or more of gNB-DUs 204 and 206, RP 113 or TP 111. Alternatively, NG-RAN node 200 may include one or more of gNB-DUs 204 and 206, RP 113 or TP 111 but may not include LSS 117. Further, the elements shown in FIG. 2 may be logically separate but physically co-located or may be partially or completely physically separate. For example, LSS 117 may be physically separate from gNB-CU 202 or may be physically combined with gNB-CU 202. Similarly, one or more of gNB-DUs 204 and 206, RP 113 or TP 111 may be physically separate from gNB-CU 202 or may be physically combined with gNB-CU 202. In the case of physical separation, the F1 interface may define signaling over a physical link or connection between two separated elements. In some implementations, gNB-CU 202 may be split into a control plane portion (referred to as a CU-CP or gNB-CU-CP and a user plane portion (referred to as CU-UP or gNB-CU-UP). In this case, both the gNB-CU-CP and gNB-CU-UP may interact with gNB-DUs 204 and 206 to support NR Uu air interface signaling for control plane and user plane, respectively. However, only the gNB-CU-CP may interact with LSS 117, TPs 111 and RPs 113 to support and control location related communication.

Protocol layering between the gNB-CU 202 and the TP 111, RP 113, and LSS 117 may be based on F1 C as defined in 3GPP TS 38.470, which uses F1AP at the top level as specified in 3GPP TS 38.473. New messages to support positioning could be added directly into F1AP or could be introduced in a new location specific protocol which is transported using F1AP.

The location procedures between the gNB-CU 202 and LSS 117 may comprise all location related procedures on NG, Xn, and NR-Uu interfaces. For example, the location procedures between AMF 115 and the NG-RAN node 200 may use NGAP. The location procedures between NG-RAN node 200 and other NG-RAN nodes, e.g., gNBs 110, may use XnAP or a protocol above XnAP, such as an extended NR Positioning Protocol A (NRPPa) as defined in 3GPP TS 39.455. The location procedures between NG-RAN node 200 and UE 102 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC (LPP) messages may be carried in an UL/DL RRC (LPP) Message Transfer.

The above support may also be realized with a single F1AP UL/DL LSS Message Transfer container and/or a new location protocol transported using F1AP. Thus, a gNB-CU 202 could forward any location related transfer messages received on NG, Xn and Uu interfaces to the LSS 117 (either within the same gNB 110 (e.g. in case the gNB includes an LSS, as illustrated in FIG. 2) or to another gNB (e.g. in case the gNB has no LSS)).

The location procedures between the LSS 117 and the gNB-DUs 204 and 206, TP 111, and RP 113, which may be coordinated by a gNB-CU 202, may include the transfer of UL/DL PRS configuration and the transfer of UL/DL PRS measurement information. The above functionality may be similar to that of LTE LMUs as specified in 3GPP TS 36.305 and TS 36.459 (SLmAP) and also similar to that between LMF 120 and NG-RAN node 200. Therefore, NRPPa could be extended to support TRP location measurement/configuration messages which can be carried inside F1AP transport messages.

Thus, the NG-RAN node 200 may support signaling and location procedures between a gNB-CU 202 and LSS 117 based on F1AP to support the same location procedures as supported on NG, Xn, and NR-Uu interfaces and, in addition, support transfer of a UL/DL PRS configuration and measurements information to/from a gNB-DU/TRP from/to the LSS.

As can be seen, the NG-RAN location functionality (LSS) may be realized using existing interfaces and protocols. However, given that there are common location procedures on Xn, NG and F1, it would be efficient to define a new generic RAN location protocol which could be transported by Xn-C or F1-C (and probably NG) transfer messages. Given that most functionality would also be required between LMF and NG-RAN Node (i.e., to support new Rel-16 location methods and features by a 5GCN LMF), it may also be possible to extend NRPPa to support the additional RAN location messages.

As discussed above, a UE 102, LCS Client 130 or AF that is requesting the location of a target UE may know a time at which the location should be obtained. This time can be provided as part of a location related request as the scheduled location time. A location server, such as LMF 120 or LSS 117 may schedule location measurements for the target UE 102 to occur at or near to the scheduled location time and return the resulting UE location to a recipient UE, LCS Client or AF. The location of the UE 102 at precisely the scheduled location time may be the objective, although there can be an allowance in LCS quality of service (QoS) for some uncertainty or error in achieving the scheduled location time. A scheduled location time can be used with a 5GC-MT-LR, 5GC-MO-LR or deferred 5GC-MT-LR for periodic or triggered location events.

Figure 3:
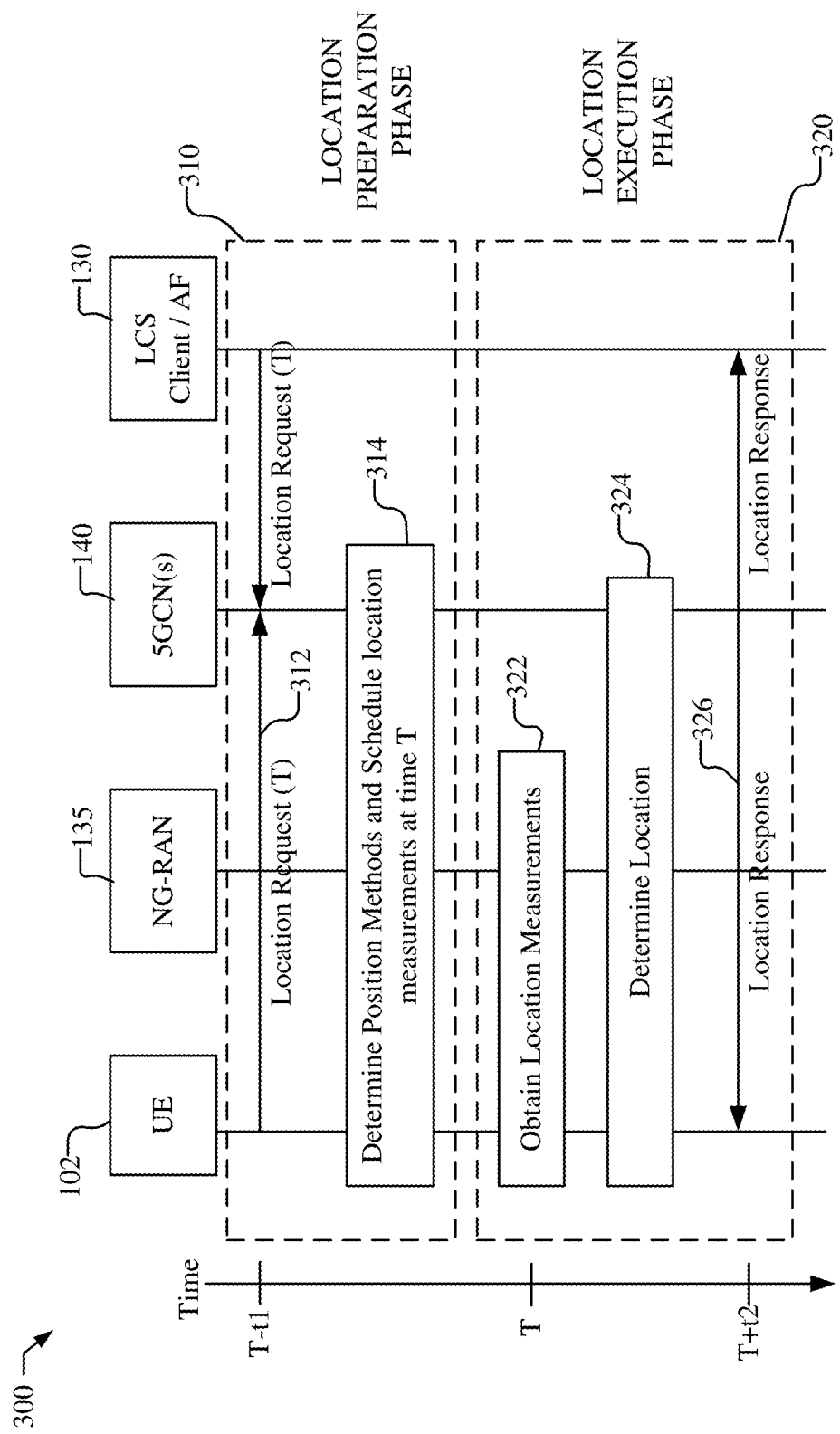
FIG. 3 illustrates messaging flow illustrating the messaging for determining the location of a UE using a scheduled location time.

FIG. 3 illustrates a messaging flow 300 between an LCS Client/AF 130, a 5GCN 140, and NG-RAN 135, and the UE 102 for determining the location of the UE 102 using a scheduled location time. The location determination may be performed by an LMF 120, e.g., in the 5GCN 140 or an LSS 117 in the NG-RAN 135, e.g., in a UE assisted positioning procedure, such as multi-RTT. The positioning procedure used during messaging flow 300 may include transmission and measurement of one or both of DL PRS and an UL sounding reference signal (SRS). The DL PRS and UL SRS measurements, for example, may be used to support a positioning method such as multi-cell RTT (also referred to as multi-RTT) in which UE 102 obtains measurements (e.g. Rx-Tx measurements) of DL PRS (e.g. transmitted by gNBs 110) and gNBs 110 in NG-RAN 135 obtain measurements (e.g. Rx-Tx measurements) of UL SRS (transmitted by the UE 102). Additionally, the procedure may be used with positioning measurements, such as UL TDOA, UL AOA, DL TDOA, DL AOD, A-GNSS, WLAN, RTT, or some combination of these. When a scheduled location time is used, as illustrated in messaging flow 300, a location procedure consists of two phases: a location preparation phase 310 and a location execution phase 320.

At stage 312, the location preparation phase 310 starts when a location related request is sent by an LCS Client 130, AF or UE 102 to a location server, such as LMF 120 in 5GCN 140, requesting a current location of the UE. The request includes the scheduled location time T and the request is sent some time t1 before the scheduled location time, i.e., is sent at time T–t1.

At stage 314, as part of the location preparation phase 310, the 5GCN 140, NG-RAN 135 and/or UE 102 interact to determine suitable position methods and schedule location measurements of or by the UE 102 to occur at or near to the time T. The location preparation phase 310 ends just before the time T.

At stage 322, the location execution phase 320 starts at or near to the time T with the NG-RAN 135 and/or UE 102 obtaining the location measurements that were scheduled during the location preparation phase 310.

At stage 324, following the location measurements at stage 322, the location execution phase 320 includes a determination of the UE location (e.g. by the UE 102 for UE based position methods or by the LMF 120 in the 5GCN 140 or LSS 117 in the NG-RAN 135 for UE assisted or network based position methods).

At stage 326, the UE location is transferred to a recipient LCS Client 130, AF or the UE 102 sometime t2 after the scheduled location time T, i.e., is transferred at time T+t2.

The duration of the location preparation phase (t1 in FIG. 3) is not included in the overall location response time. Instead, the location response time equals the duration of the location execution phase (t2 in FIG. 3), which may enable a reduction of latency.

A scheduled location time only applies when an external LCS Client 130, AF or the UE 102 is aware of a specific time in the future at which the location of the UE is needed. A requirement for a scheduled location time accuracy may be provided by an LCS Client, AF or UE in addition to a scheduled location time as part of a location request for a UE 102. The scheduled location time accuracy may indicate how close to the scheduled location time the location of the UE 102 is to be obtained. For example, when the scheduled location time is T and if the scheduled location time accuracy is t, then the location of the UE 102 at a time T* may need to be obtained where T* must lie within a period T–t to T+t. Obtaining the location of UE 102 at the time T* would then satisfy the requirement for the scheduled location time accuracy t.

A scheduled location time may or may not interact with an LCS Quality of Services (QoS) when a scheduled location time accuracy is included. For example, with respect to a location accuracy requirement that is part of the LCS QoS, when a scheduled location time accuracy is included, there may need to be no interaction and the location accuracy requirement need not be affected by the presence of a scheduled location time and scheduled location time accuracy. With respect to a response time requirement that is part of the LCS QoS, a low delay requirement and a delay tolerant requirement for response time can each still be allowed, but may apply only to the location execution phase shown in FIG. 3 and not to the location preparation phase in FIG. 3. With respect to an LCS QoS Class, with an assured class for the LCS QoS Class, the scheduled location time accuracy can either be fulfilled or, if the scheduled location time accuracy cannot be fulfilled, no UE location may be obtained and an error cause may be provided instead to an LCS Client, AF or the UE. With a best effort class for the LCS QoS Class, if a scheduled location time accuracy is not fulfilled, a location may still be obtained and provided to an LCS Client, AF or UE with an indication that the scheduled location time accuracy was not fulfilled.

When a scheduled location time accuracy is not included either explicitly or by default, an LCS QoS response time requirement can treated as just described and an LCS QoS location accuracy requirement can be reinterpreted as applying to the accuracy of the obtained location relative to the actual location of the UE at the scheduled location time. Reinterpreting LCS QoS location accuracy in this way can mean that a location error or location uncertainty can include a component caused by motion of the UE during a time period between the scheduled location time and the time applicable to the location obtained for the UE. This may impact location determination but can avoid an LCS Client needing to specify a scheduled location time accuracy.

It should be understood that during positioning, measurements can be obtained at a plurality of times at or near the scheduled location time T. The determination of the location of the UE is based on these measurements, but the positioning procedures may use the best measurements (e.g., measurements based on the strongest received signals or signals with least interference, etc.), and accordingly, the time applicable to the location obtained for the UE may not be precisely the scheduled location time T. Thus, while the location determination for the UE may have a scheduled location time T, the time applicable to the location that is determined for the UE may be at a slightly different time T1. For example, the position measurements used to determine the location of the UE may be obtained at a time T1.

Moreover, location determination, with or without use of a scheduled location time, will typically include a location uncertainty. For example, the estimated location for a UE may differ from the true location of the UE, and the difference between the estimated location and the true location is the location error or uncertainty.

The uncertainty of a resulting location for a UE may include a component from the location determination and may further include a component caused by a time error, i.e., a location time uncertainty. The location time uncertainty t may be expressed in two alternative ways. One option (A) is to explicitly specify t, which, in the case of a scheduled location time, can be supported using a scheduled location time uncertainty or scheduled location time accuracy (e.g. which may be equal to t). The other option (B) may be to include the location time uncertainty as part of location uncertainty, which is treated as an uncertainty or error in the UE location at a time T. For example, assume a UE is at a location L at time T, at a location L1 at a time T1 (where T1 is close to T) and that a location L2 is estimated (e.g. calculated) for the UE at the time T1. Then with option A, the location error is L1–L2 and the time error is T–T1. With option B, the location error is L–L2 and there is no explicit time error.

Figure 4:
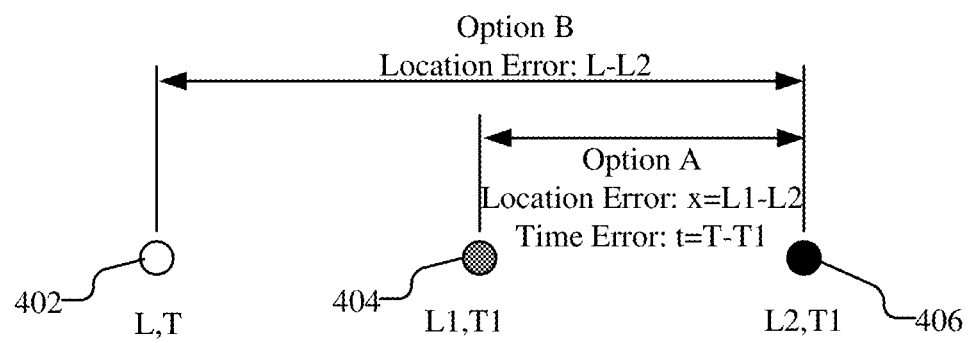
FIG. 4 illustrates location determination for a UE using a scheduled location time and resulting locations and uncertainties.

FIG. 4 illustrates an example of location determination for a UE 102 using a scheduled location time T, when the time applicable to the location that is determined for the UE 102 is a different time T1. As indicated by the white spot 402, the UE 102 may be at a location L at the scheduled location time T. The grey spot 404 illustrates the actual location L1 of the UE 102 at time T1, which is the time applicable to the location obtained for the UE 102. The actual location L1 (at time T1), illustrated by grey spot 404, is in a different location than the location L (at time T), illustrated by the white spot 402, based on an assumption that the UE 102 is moving. If the UE 102 is stationary between times T and T1, the actual location L1 at time T1 would be coincident with the location L at time T. Additionally, the black spot 406 in FIG. 4 illustrates an estimated (e.g. calculated) location L2 of the UE 102 at time T1. The estimated location L2 (at time T1), illustrated by black spot 406, is in a different location than the actual location L1 (as time T1), due to a location error (e.g. an error in location measurement and/or location calculation).

Thus, as illustrated by FIG. 4, due to the use of a scheduled location time, the location error may include a component caused by the location determination, and may further include a component caused by motion of the UE 102 during a time period between the scheduled location time and the time applicable to the location obtained for the UE 102. Accordingly, when reporting the determined location of the UE 102 for the scheduled location time, an uncertainty of the location should include not only the location error component, but the time error component as well.

In one option, i.e., Option A illustrated in FIG. 4, the uncertainty of the location may be reported with the separate location error and time error components. For example, the location error component is an estimate (e.g. prediction) of the difference x between the actual location L1 at the measurement time T1 and the estimated location L2 at the measurement time T1, i.e., x=L1–L2. The time error component is an estimate of the difference t between the scheduled location time T and the measurement time T1, i.e., t=T–T1.

In another option, i.e., Option B illustrated in FIG. 4, the uncertainty of the location may be reported based on a combination of the location error component and the time error component. For example, the time error component may be converted to a location error based on a known (e.g. measured) velocity of the UE 102 or based on UE 102 location measurements that are obtained both shortly before and shortly after the scheduled location time. Accordingly, a combined location error may be reported as an estimate of L–L2, which includes the time error component, and thus, no separate time error component is reported.

Figure 5:
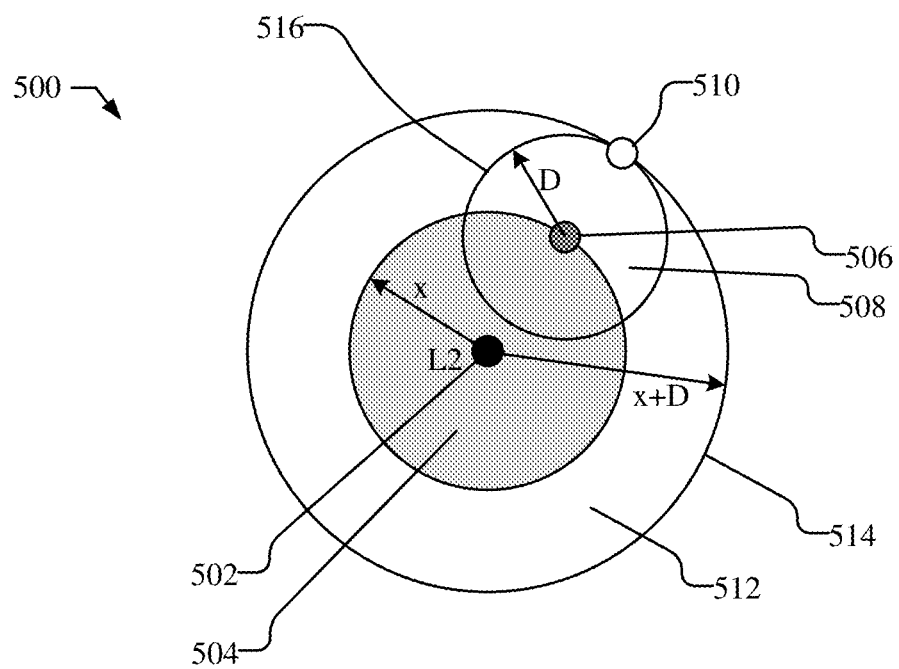
FIG. 5 illustrates location uncertainties and timing uncertainties associated with an estimated location of a UE.

FIG. 5 illustrates an example 500 of uncertainties that may be associated with a determined location of a UE 102 due to the location uncertainty and the time uncertainty from scheduled location time. FIG. 5 illustrates location in 2 dimensions in a horizontal plane (e.g. in an X-Y coordinate system), though a 3 dimensional version of FIG. 5 may be created by transforming the circles shown in FIG. 5 into spheres. As described in FIG. 4, the UE 102 has an actual location L at the scheduled location time T, and an actual location L1 at the measurement time T1, and an estimated location L2 at the measurement time T1, where time T1 may differ from time T by a maximum amount t, according to T–t≤T1≤T+t. For example, t might be a scheduled location time accuracy requirement or accuracy target which may be implicit and might be estimated based on known times at which location measurements for the UE 102 are obtained.

As illustrated in FIG. 5, the estimated location L2, illustrated by black spot 502, is the location obtained by a location server, e.g., LMF 120 or LSS 117, or by the UE 102 for the UE 102 at time T1, when the UE 102 is at actual location L1. The estimated location L2 is associated with a location uncertainty area 504 illustrated as the grey interior of a circle around spot 502 having a radius x, where x is an estimated maximum difference between the estimated location L2 and the actual location L1 at time T1, i.e., x=MAX (L1–L2). There may be some confidence associated with the value x. For example, x may be estimated such that L1–L2 is less than x with a 67% (or 90% or 95%) probability. The actual location L1 at time T1 may lie anywhere within the uncertainty area 504 with radius x (e.g., with some level of confidence). It should be understood that the uncertainty area 504 may not be the interior of a circle, but may have other geometric shapes (e.g., may be the interior of an ellipse or the interior of a three dimensional sphere or ellipsoid). Moreover, the size (radius) of the uncertainty can be determined by a desired confidence level as already discussed. In other words, while the estimated location L2 is known, the actual location L1 at time T1 is not known, but the uncertainty may be determined with a desired confidence level, e.g., such that the actual location L1 has a desired probability (confidence level) of being located within the uncertainty area 504. The determination of the location uncertainty area 504 with a desired confidence level is conventionally performed and reported during positioning.

The grey spot 506 represents one possibility for the actual location L1 for the UE if the estimated location has the maximum error, i.e., the actual location L1 is on the perimeter (or surface) of the uncertainty area (or volume) 504. The actual location L1 at spot 506 is associated with a time uncertainty t that is the difference (or maximum difference) between the scheduled location time T and the measurement time T1, i.e., t=T−T1 (or t=MAX (T−T1)). The location server, e.g., LMF 120 or LSS 117 (or UE 102) may determine a distance D associated with the time uncertainty t, e.g., based on a velocity of the UE 102, which the server (or UE 102) may receive from the UE 102 or may determine D using one or more location measurements. The distance D can be an estimate of the maximum distance between location L and location L1 and thus an estimate of the maximum distance moved by the UE 102 between time T and time T1. As before, the distance D can have an associated confidence—e.g. where the actual distance between locations L and L1 is less than D with a confidence of 67% (or 90% or 95%). The distance D may be determined based on an estimated velocity v of the UE 102 and the time uncertainty t, which leads to D=v*t. The distance D associated with the time uncertainty t may be determined from a number of measurements, or based on UE 102 location measurements that are obtained both shortly before and shortly after the scheduled location time T. For example, a plurality of measurements near to or at the scheduled location time T may be obtained, and the determination of the estimated location L2 of the UE 102 may be based on the best measurements from measurement time T1 (e.g., measurements based on the strongest received signals or signals with least interference, etc.). The location server (or UE 102) may generate additional location estimates using the plurality of measurements over the period T−t to T+t and may determine the distance D based on these location estimates. The actual location L may then lie within a distance D of the actual location L1 and hence may be located anywhere within an uncertainty area 508 that is the interior of a circle 516 with radius D and centered on the location L1. A possible location L having a maximum distance to the estimated location L2 is shown by the white spot 510. Similar exemplary locations for L1 and L can be added in FIG. 5 using other grey and white spots 506 and 510. The white spots 510 with a maximum distance from the location L2 will then lie on the circumference of the circle 514 that is centered on the location L2 and has a radius of x+D.

The white spot 510 represents one possibility for the actual location L for the UE 102 at the scheduled location time T. The actual location L1 (shown with grey spot 506), however, may be at any position on the perimeter of, or within, the uncertainty area 504. Similarly, for each possible actual location L1, the actual location L may be anywhere on the perimeter of, or within, an uncertainty area 508, which in this example is the interior of the circle 516 (though might be another geometric shape such an ellipse, sphere or ellipsoid in a different example). The combination of the uncertainty area 504 for the actual location L1 and the uncertainty area 508 for the actual location L for each possible actual location L1 leads to an uncertainty area 512 for the actual location L that is the union of all possible uncertainty areas 508. In the example in FIG. 5, the uncertainty area 512 is the interior of the circle 514 though might have other geometric shapes (e.g. an ellipse, sphere or ellipsoid) in other examples. Accordingly, the location uncertainty area 512 for the location L (which may also be referred to as just a location uncertainty), which is associated with the estimated location L2 at spot 502, may be generated (e.g. with a certain size and shape) based on the location uncertainty x for the location L1 (which is also the location error for the location L2 relative to the location L1) and the distance D that corresponds to the time uncertainty t for the location L1 (which is also the time error for the location L2). In this example, the combined location uncertainty 512 (which applies to Option (B) described previously) may be the interior of a circle having a radius x+D.

Figure 6:
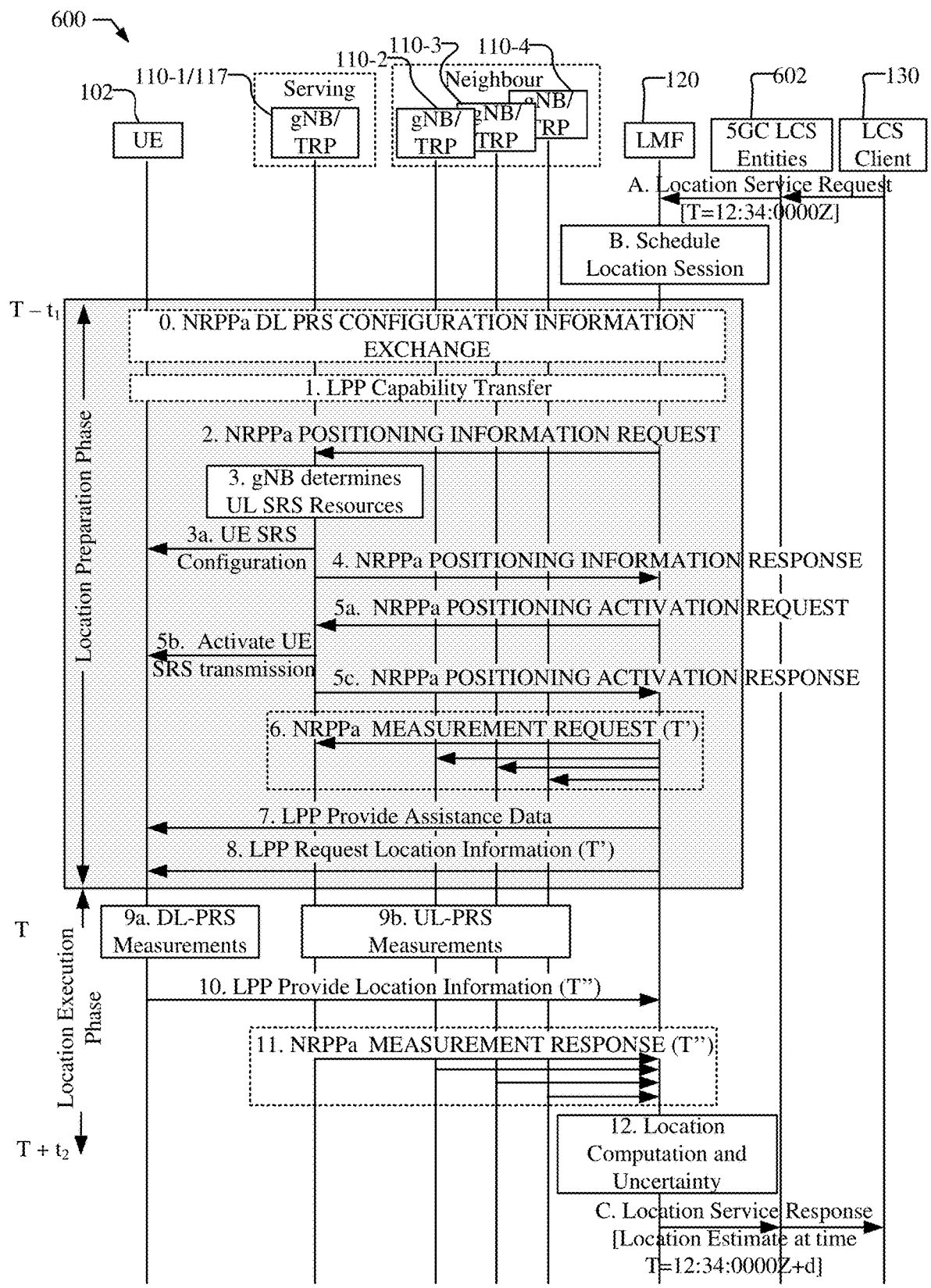
FIG. 6 is a message flow illustrating the messaging for determining the location of a UE using a scheduled location time.

FIG. 6 is a message flow 600 illustrating messaging between an LCS client 130, 5GCN LCS entities 602 (such as GMLC 125 or AMF 115 and NEF 127), the LMF 120, the gNBs 110, and the UE 102 for a multi-RTT positioning procedure as described in 3GPP TS 38.305 in which the time for location determination of the UE is scheduled in advance. The serving gNB 110-1 and multiple neighboring gNBs 110-2, 110-3, and 110-4 may be gNBs collectively referred to as gNBs 110. While the use of LMF 120 is illustrated in FIG. 6, it should be understood that other entities may be used in place of the LMF 120 for determining the location and uncertainty of the location of the UE 102 including, e.g., an SLP 129, or LSS 117 (or LMC) in the NG-RAN 135, or the UE 102. For example, the LSS 117 may be a logical function of the serving gNB 110-1 CU. In some implementations, the LSS 117 may be inside the gNB 110-1, but connected to the CU or outside the gNB 110-1. For example, if the LSS 117 is outside the gNB 110-1 or separate from the gNB 110-1 CU, additional messages (e.g. XnAP messages) may be used to transfer messages from the gNB 110-1 to the LSS 117 and back from the LSS 117 to the gNB 110-1. The positioning procedure illustrated in FIG. 6 includes both DL PRS and UL SRS measurements for the sake of inclusiveness. The DL PRS and UL SRS measurements, for example, may be used to support a positioning method such as multi-cell RTT (also referred to as multi-RTT) in which UE 102 obtains DL measurements and gNBs 110 obtain UL measurements. It should be understood, however, that the procedure illustrated in FIG. 6 may be used with other types of positioning methods that rely, e.g., on only DL PRS by excluding the stages related to UL SRS, or that rely on only UL SRS by excluding the stages related to DL PRS. Accordingly, the procedure may be used with positioning measurements, such as UL-TDOA, UL-AOA, DL-TDOA, DL-AOD, A-GNSS, WLAN, RTT, multi-cell RTT or some combination of these. For example, to support UL position methods such as UL-TDOA or UL-AOA in which gNBs 110 measure UL SRS signals from UE 102 but UE 102 does not measure DL PRS signals from gNBs 110 or other DL signals (e.g. from SVs 190 or a WLAN AP), stages 0, 7, 8, 9a and 10 in FIG. 6 may be omitted. Similarly, to support DL position methods such as DL-TDOA, DL-AOD, A-GNSS or WLAN in which UE 102 measures DL PRS signals from gNBs 110 or other DL signals (e.g. from SVs 190 or a WLAN AP) but gNBs 110 do not measure UL SRS signals from UE 102, stages 2-6, 9b and 11 in FIG. 6 may be omitted.

As illustrated in FIG. 6, the positioning procedure may request and schedule the location of the UE 102 in advance of when it is needed, e.g., at time T. Accordingly, on the left side of the message flow is a timeline illustrating when various stages are performed relative to the scheduled location time T. As illustrated, stages 0-8 are all part of the location preparation phase and are performed before time T. At time T, the UL and DL signals are transmitted and measured. After time T, the location execution phase occurs, which is illustrated as including stages 9-12 and C. The message flow 600 illustrates the use of the LMF 120 for position determination, but if desired, the LSS 117 (or LMC) in the serving gNB 110-1, or the UE 102 itself, may be used to further reduce latency in the positioning procedure, e.g., during the location execution phase.

At stage A in FIG. 6, a Location Service Request from an LCS Client 130 is sent to the LMF 120 via one or more 5GCN LCS entities 602, and includes the scheduled location time T in a format suitable for the LCS client 130. In this example, the location time T may be provided in Coordinated Universal Time (UTC) and defines the request to obtain the target device location at T=12:34:0000Z in the future. The request may include the required uncertainty for the location for the UE, which may be a maximum difference (e.g. maximum distance) between an estimated location and the actual location of the UE at the scheduled location time T. The request, for example, may include a time window or uncertainty t for the location time; i.e., the desired location time is then T+t seconds. As discussed in FIG. 4, the location time uncertainty t can be expressed in two alternative ways. One option (A) is to explicitly specify t. The other option (B) is to include location time uncertainty as part of location uncertainty which is treated as the uncertainty or error in the UE location at time T. For example, assume the UE 102 is at location L at time T, at location L1 at a time T1 (close to T) and that a location L2 is obtained for the UE at time T1. Then with option A, the location error is L1−L2 and the time error is T−T1. With option B, the location error is L−L2 and there is no time error. Option B may require a more complex LMF 120 (or SLP 129, LSS 117 or UE 102) implementation which would need to determine location uncertainty based on both error in location and error in time as discussed for FIG. 5. Thus, in implementations in which a combined location and time uncertainty is supported for a scheduled location time, a time window or uncertainty t may not be provided at stage A, and instead just a required location accuracy (e.g. a maximum location error) may be provided, based on support of Option B. However, a location server (e.g. LMF 120) may still determine a time window or uncertainty t which is not visible to an LCS Client 130 which may be used to help support a required location accuracy specified by the LCS Client 130.

At stage B, the LMF 120 schedules the location session for the target UE 102 such that the UE location can be obtained (e.g. as close as possible) for the requested time T (i.e., in this example the UE location valid at time T=12: 34:0000Z).

The Location Preparation Phase starts with stage 0 at time T−$t_1$, where $t_1$ depends on the expected duration of the location preparation phase (which depends on e.g. selected positioning method(s), etc.).

At stage 0, the LMF 120 and gNBs 110 may use a NRPPa DL PRS configuration information exchange, e.g., as described in 3GPP TS 38.455, to obtain from gNBs 110, or send to gNBs 110, DL PRS configuration information (e.g. including parameters for DL PRS transmission such as PRS frequency, bandwidth, timing, coding, muting, frequency hopping) required for a positioning method, e.g., Multi-RTT positioning. The PRS configuration information can also be sent as assistance data to UE 102 (at stage 7) and/or to LSS 117 (not shown). The PRS configuration information can be used by: UE 102 to assist DL PRS measurements at stage 9a; LMF 120 to request UL SRS configuration information from the serving gNB 110-1 for the UE 102 at stage 2; and/or by LSS 117 to assist calculation of the UE 102 location.

At stage 1, the LMF 120 may request the positioning capabilities of the UE 102 using a LPP Capability Transfer procedure, e.g., described in 3GPP TS 37.355.

At stage 2, the LMF 120 sends a NRPPa POSITIONING INFORMATION REQUEST message to the serving gNB 110-1 to request UL information for the UE 102.

At stage 3, the serving gNB 110-1 determines the resources available for UL SRS and configures the UE 102 with the UL-SRS resource sets at stage 3a.

At stage 4, the serving gNB 110-1 provides the UL SRS configuration information to the LMF 120 in a NRPPa POSITIONING INFORMATION RESPONSE message.

At stage 5a, the LMF 120 sends an NRPPa POSITIONING ACTIVATION REQUEST, requesting UE SRS activation to the serving gNB 110-1. The NRPPa POSITIONING ACTIVATION REQUEST message may include the time T at which the location for the UE 102 is to be measured and thus the time at which UE 102 needs to transmit UL SRS to enable the UL measurements at stage 9b to occur at or near to the time T. At stage 5b, the serving gNB 110-1 activates the UE SRS transmission, at or near to the time T. The UE 102 will wait until at or near to the time T to begin the UL SRS transmission. At stage 5c, the serving gNB 110-1 sends an NRPPa POSITIONING ACTIVATION RESPONSE message to the LMF 120 indicating SRS activation of the UE 102.

At stage 6, the LMF 120 requests UL measurements of the UE 102 UL SRS transmission by selected gNBs 110 by sending an NRPPa MEASUREMENT REQUEST message to each of the selected gNBs 110. Each message may include an indication of the physical measurement time T' to perform the UL measurements. The time T' ultimately defines the time when the UE 102 location is valid/obtained. The time T' may specify an NR or LTE System Frame Number (SFN) and/or subframe slot number for example. The time T' can have a one to one (1:1) relation to T (e.g., 1:1 relation to the UTC time requested at stage A). For example, T' may equal T or may be slightly different (e.g. 1-100 milliseconds (ms) different). The difference may be needed if it is not possible to schedule UL SRS transmission by UE 102 or DL PRS transmission by gNBs 110 at exactly the time T. The message includes all information required to enable the gNBs/TRPs 110 to perform the UL measurements.

At stage 7, the LMF 120 sends an LPP Provide Assistance Data message to the UE 102. The message includes any required assistance data for the UE 102 to perform the necessary DL PRS measurements (e.g. includes PRS configuration information sent or received by LMF 120 at stage 0).

At stage 8, the LMF 120 sends an LPP Request Location Information message to the UE 102 to request DL measurements (e.g. UE Rx-Tx) to support Multi-RTT. The Request Location Information message includes an indication of the time T' as at stage 6 (e.g. where T'=T or T' is slightly different from T). The Request Location Information message may further indicate the type of positioning method to be used, e.g., UE assisted multi-RTT.

At stage 9a, at or near to the scheduled location time T, the UE 102 performs location measurements, e.g., of the DL PRS measurements such as RSTD, RSRP, RSRQ, AOD, AOA, Rx-Tx from all gNBs 110 provided in the assistance data at stage 7. The UE 102 performs the measurements such that the measurements/location is valid at time T' (e.g. the physical time base corresponding to T). The location measurements may additionally or alternatively include at least one of a GNSS pseudorange, a GNSS code phase, a GNSS carrier phase, a WiFi measurement (RSSI, AOA or RTT), a Bluetooth measurement (RSSI, AOA or RTT), a measurement of DL NR signals from a gNB (RSTD, RSRP, RSRQ, AOD, AOA, Rx-Tx), a measurement performed by a sensor, such as an inertial sensor, barometer, etc.

At stage 9b, at or near to the time T, each gNB 110 configured at stage 6 measures the UL SRS transmissions from the UE 102, such as AOA, RSRP, Rx-Tx, TOA. The gNBs 110 perform the measurements such that the measurements/location is valid at time T' (e.g. the physical time base corresponding to T).

The UE 102 and/or the gNBs 110 at stages 9a and 9b thus obtain a plurality of measurements within a time period that may include the scheduled location time T. For example, the measurements may occur within a time period that is less than 1 second, less than 100 ms, less than 10 ms or less than 1 ms in duration.

At stage 10, the UE 102 reports the measurements performed at stage 9a to the LMF 120 in a LPP Provide Location Information message, which may identify a time of measurement T". The location report at stage 10 includes the measurements/location estimate and optionally together with the time T" (e.g. where T" is as close as possible to the requested time T'; i.e., ideally T"=T'). The location time error is then δ=(T"−T'). The UE 102 may provide an indication of its velocity and/or a distance moved between time T' and time T" or measurements (e.g. sensor measurements) that allow LMF 120 to determine UE 102 velocity or distance moved.

At stage 11, each of the neighboring gNBs 110-2, 110-3, and 110-4 reports the measurements performed at stage 9b to the LMF 120 in NRPPa Measurement Response messages, which may also identify a time T''' when the measurements were obtained. The location report at stage 11 includes the measurements/location estimate together optionally with the time T''' (e.g. where T''' is as close as possible to the requested time T'; i.e., ideally T'''=T'). The location time error is then δ=(T'''−T').

At stage 12, the LMF 120 determines the location of the UE 102 based on the measurements received at stages 10 and 11. For example, the LMF 120 may determine the RTTs from the UE 102 and gNB 110 Rx-Tx Time Difference Measurements for each gNB 110 for which corresponding UL and DL measurements were provided at stages 10 and 11 and calculate the position of the UE 102. The LMF 120 further determines an uncertainty of the location. The LMF 120, for example, may determine the location of the UE 102 with an uncertainty that does not exceed the required uncertainty indicated at stage A. As discussed in FIGS. 4 and 5, the LMF 120 may determine an uncertainty, which is an indication of a difference between the determined (i.e. estimated) location of UE 102 and the actual location of UE 102 at the scheduled location time T. The location for the UE 102 may be an estimate of the actual location of the UE 102 at a time T1 that is within a time period that includes the scheduled location time T. This time period, for example, may be less than 1 second, less than 100 ms, less than 10 ms or less than 1 ms. The uncertainty of the location of UE 102 may indicate an error in the estimate of the actual location of the UE 102 at the time T1 combined with an error in an estimate of a distance moved by the UE 102 between the time T and the time T1. As discussed in FIGS. 4 and 5, the uncertainty of the location, for example, may be a combination of a first location uncertainty for the location that is based on the location measurements but not based on the scheduled location time, and a second location uncertainty that is based on the scheduled location time. For example, as discussed in FIGS. 4 and 5, the LMF 120 may determine the uncertainty of the location by determining a first location uncertainty based on an estimate of a difference between a determined location L2 and an actual location L1 of the UE 102 at a time T1 during a plurality of times and/or during a time period that measurements were obtained in stages 9a and 9b. A second location uncertainty may be determined based on an estimate of a difference between the actual location L1 of the UE 102 at the time T1 and an actual location L of the UE at the scheduled location time T. The LMF 120 may combine the first location uncertainty and the second location uncertainty to determine the uncertainty of the location of UE 102.

It should be understood that while stage 12 illustrates the LMF 120 determining the location and uncertainty of the UE 102, other entities may perform this stage including the UE 102, the SLP 129, a gNB 110, the LSS 117 (or an LMC in an NG-RAN 135).

At stage C, the LMF 120 sends a Location Service Response to the LCS client 140 via the one or more 5GCN LCS entities 602, which provides the UE 102 location and the location uncertainty that indicates a difference between the location and the actual location of the UE at the scheduled location time T. In this example, a time stamp could also be included indicating a location time is T=12: 34:0000Z+δ. This location estimate is received by the LCS client 130/-at time T+t2 (i.e., at T=12:34:0000Z+δ+t2 in this example), where t2 is the latency and δ (which may be either positive or negative) is the difference between the requested and actual location time.

Figure 7:
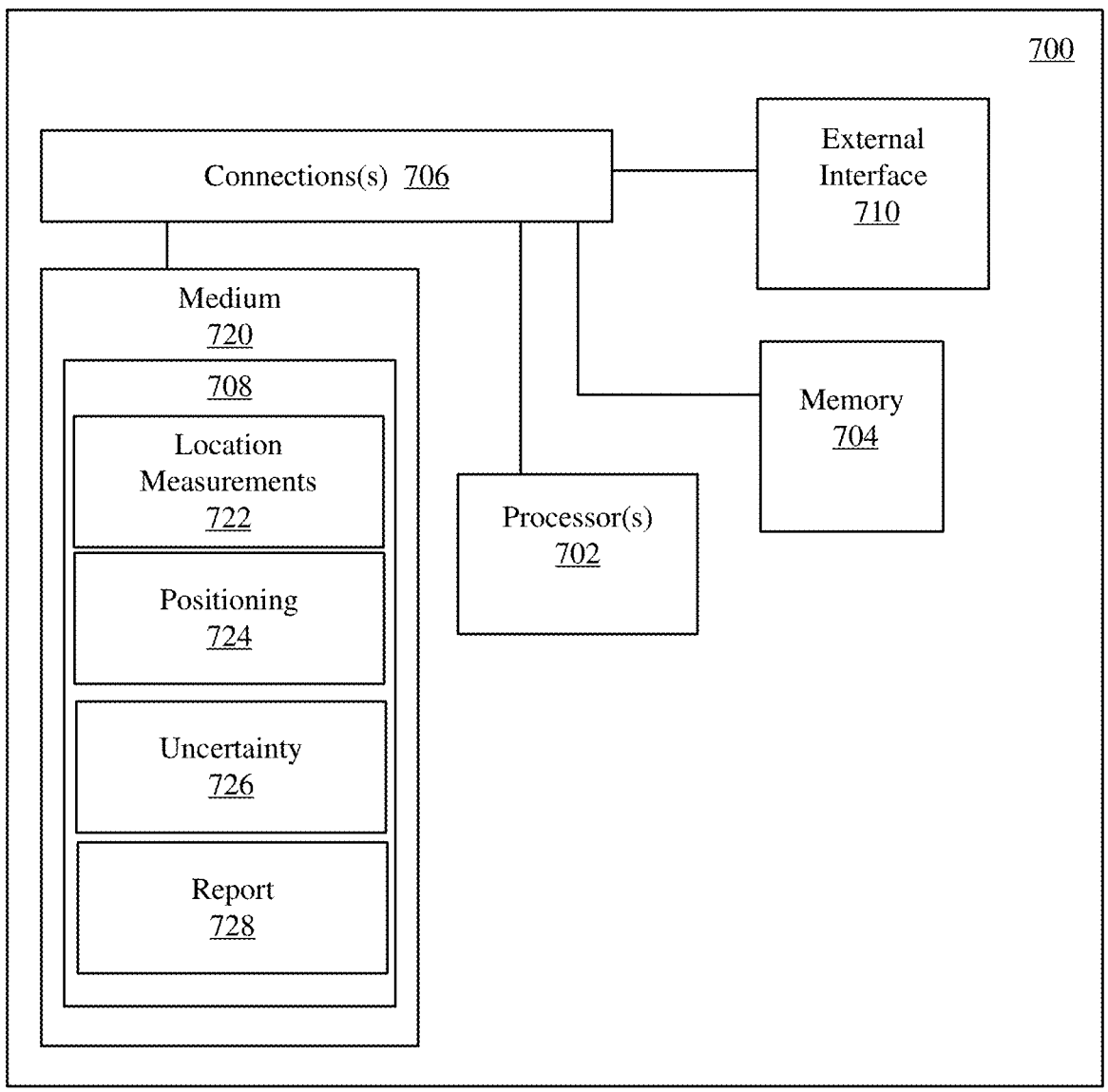
FIG. 7 shows a schematic block diagram illustrating certain exemplary features of an entity that is configured to perform positioning of a UE using a scheduled location time.

FIG. 7 shows a schematic block diagram illustrating certain exemplary features of an entity 700 in a wireless network that is configured to perform positioning of a UE 102 using a scheduled location time and combined location and time uncertainties, as discussed herein. The entity 700 may be an LMF 120, an SLP 129, gNB 110, LSS 117 (or LMC) in the NG-RAN 135, or the UE 102, as shown in FIGS. 1 and 2. The entity 700 may be configured to perform the message flow 600 illustrated in FIG. 6, including the determination of uncertainty, as illustrated in FIGS. 4 and 5, and the procedure 800 illustrated in FIG. 8 along with other algorithms discussed herein. The entity 700 may, for example, include one or more processors 702, memory 704, an external interface 710 (e.g., wireline or wireless network interface to base stations, UEs, and/or entities in the core network), which may be operatively coupled with one or more connections 706 (e.g., buses, lines, fibers, links, etc.) to non-transitory computer readable medium 720 and memory 704. In certain example implementations, all or part of entity 700 may take the form of a chipset, and/or the like. Depending on the implementation, the entity 700 may include additional components not illustrated herein. For example, if the entity 700 is a UE, additional components such as a SPS receiver that may receive and process SPS signals from SVs 190 shown in FIG. 1 to measure GNSS pseudorange, a GNSS code phase, a GNSS carrier phase, etc., and sensors (e.g., inertial sensors such as one or more accelerometers, one or more gyroscopes, a magnetometer, barometers, etc.). The external interface 710 of a UE may include a WWAN transceiver, including transmitters and receivers capable of measurement RSTD, RSRP, RSRQ, AOD, AOA, Rx-Tx, etc., of DL NR signals from a gNB, and/or WLAN transceiver, which includes transmitters and receivers, capable of measuring, e.g., WiFi measurements such as RSSI, AOA or RTT, Bluetooth measurement such as RSSI, AOA or RTT, etc., If the entity 700 is a base station, the external interface may include WWAN transceiver, including transmitters and receivers capable of measurement of AOA, RSRP, Rx-TX, TOA, etc., of UL SRS signals from the UE 102. The external interface 710 of a base station may further include a wireline or wireless network interface to core network entities.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of entity 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in entity 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in entity 700 is merely exemplary, and as such the functionality of the modules and/or data structures may be combined, separated, and/or be structured in different ways depending upon the implementation of the entity 700.

The medium 720 and/or memory 704 may include a location measurements module 722 that when implemented by the one or more processors 702 configures the one or more processors 702 to receive, via the external interface 710, location measurements for the UE from one or more other entities, such as the UE 102 or one or more gNBs 110. The location measurements may be obtained by the one or more other entities at a plurality of times within a time period that includes a scheduled location time, e.g., the time period may be less than 1 second, less than 100 ms, less than 10 ms or less than 1 ms. The one or more processors 702 may be further configured to receive a velocity of the UE at or near the scheduled location time.

The medium 720 and/or memory 704 may include a positioning module 724 that when implemented by the one or more processors 702 configures the one or more processors 702 to determine a location for the UE based on the location measurements. The location, for example, is an estimate of the actual location of the UE within a time period that includes the scheduled location time. The one or more processors 702, for example, may be further configured to receive a request for the location for the UE from the another entity, such as an LCS client 140, AF or UE 102. The request may include a required uncertainty for the location for the UE, the required uncertainty comprising a maximum difference between the location and the actual location of the UE at the scheduled location time. The one or more processors 702 may be configured to determine the location for the UE with an uncertainty of the location that does not exceed the required uncertainty.

The medium 720 and/or memory 704 may include an uncertainty module 726 that when implemented by the one or more processors 702 configures the one or more processors 702 to determine an uncertainty of the determined location, where the uncertainty indicates a difference between the determined location and an actual location of the UE at the scheduled location time. The determined location for the UE, for example, may be an estimate of the actual location of the UE at a time $T_1$, that is close to the scheduled location time T and the uncertainty of the location may indicate an error in the estimate of the actual location of the UE at the time $T_1$ combined with an error in an estimate of a distance moved by the UE between the scheduled location time T and the time $T_1$. The one or more processors 702, for example, may be configured to determine the uncertainty of the location by determining a first location uncertainty that is based on an estimate of a difference between the determined location and an actual location of the UE at one time during the plurality of times that the position measurements were obtained. The one or more processors 702, for example, may be further configured to determine a second location uncertainty based on an estimate of a difference between the actual location of the UE at the one time and the actual location of the UE at the scheduled location time. The second location uncertainty, for example, may be based on the velocity of the UE, e.g., received with position measurements, or based on UE location measurements that are obtained both shortly before and shortly after the scheduled location time. The one or more processors 702, for example, may be configured to combine the first location uncertainty and the second location uncertainty to determine the uncertainty of the location.

The medium 720 and/or memory 704 may include a report module 728 that when implemented by the one or more processors 702 configures the one or more processors 702 to send, via the external interface 710, the location and the uncertainty of the location to another entity, such as the requesting entity which may be, e.g., the LCS client 140, AF or UE 102.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program code 708. For example, the non-transitory computer readable medium including program code 708 stored thereon may include program code 708 to support location determination of a UE using a scheduled location time and combined location and time uncertainties in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include an external interface 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable program code 708 stored thereon, which if executed by one or more processors 702 may be operatively enabled to perform all or portions of the example operations as described herein. Computer readable medium 720 may be a part of memory 704.

Figure 8:
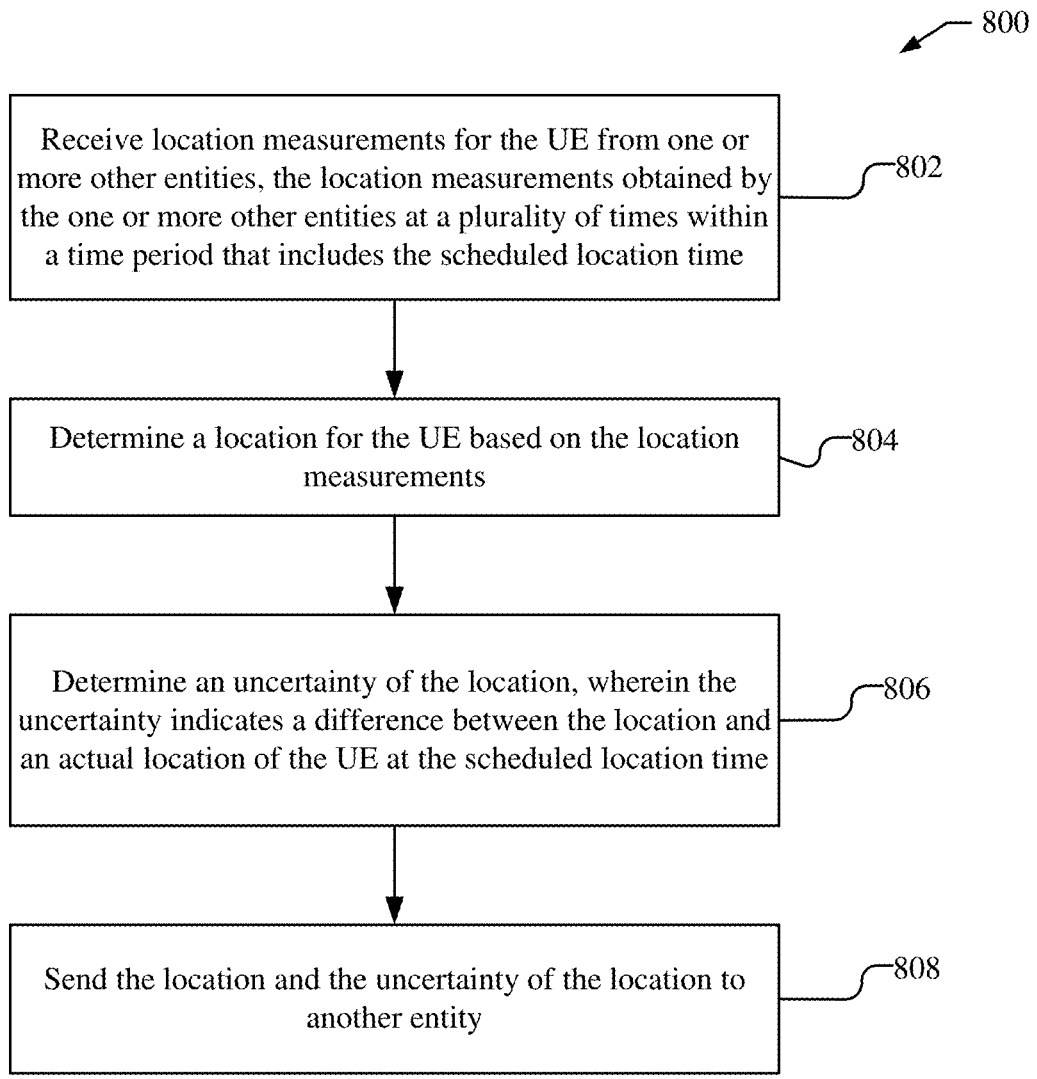
FIG. 8 shows a flowchart for an exemplary method for supporting location of a UE using a scheduled location time.

FIG. 8 shows a flowchart for an exemplary method 800 for locating a user equipment (e.g. a UE 102) at a scheduled location time, performed by an entity such as the entity of FIG. 7, which may be a UE 102, LMF 120, SLP 129, gNB 110, LSS 117 or LMC in an NG-RAN 135, in a manner consistent with disclosed implementations.

At block 802, the entity receives location measurements for the UE from one or more other entities, the location measurements obtained by the one or more other entities at a plurality of times within a time period that includes the scheduled location time, e.g., as discussed at stages 10 and 11 of FIG. 6. The one or more other entities, for example, may include at least one of the UE, a serving gNB (e.g. gNB 110-1), or neighboring gNBs (e.g. gNBs 110). The location measurements may include at least one of a GNSS pseudorange, a GNSS code phase, a GNSS carrier phase, a WiFi measurement (e.g. RSSI, AOA or RTT), a Bluetooth measurement (e.g. RSSI, AOA or RTT), a measurement of DL NR signals (e.g. DL PRS signals) from a gNB (e.g. RSTD, RSRP, RSRQ, AOD, AOA, Rx-Tx), a measurement of UL NR signals (e.g. UL SRS signals) from the UE (e.g. AOA, RSRP, Rx-Tx, TOA), a measurement performed by a sensor (e.g. an inertial sensor or barometer for the UE). The time period, for example, may be less than 1 second, less than 100 ms, less than 10 ms or less than 1 ms. A means for receiving location measurements for the UE from one or more other entities, the location measurements obtained by the one or more other entities at a plurality of times within a time period that includes the scheduled location time may include, e.g., the external interface 710 and one or more processors 702 with dedicated hardware or implementing executable code or software instructions in memory 704 and/or medium 720 in entity 700, such as the location measurements module 722, shown in FIG. 7.

At block 804, the entity determines a location for the UE based on the location measurements, e.g., as discussed at stage 12 of FIG. 6. A means for determining a location for the UE based on the location measurements may include, e.g., the one or more processors 702 with dedicated hardware or implementing executable code or software instructions in memory 704 and/or medium 720 in entity 700, such as the positioning module 724, shown in FIG. 7.

At block 806, the entity determines an uncertainty of the location, wherein the uncertainty indicates a difference between the location and an actual location of the UE at the scheduled location time, e.g., as discussed at stage 12 of FIG. 6 and discussed in FIGS. 4 and 5. For example, the location for the UE is an estimate of the actual location of the UE at a time within the time period. The uncertainty of the location may then indicate an error in the estimate of the actual location of the UE at the time combined with an error in an estimate of a distance moved by the UE between the scheduled location time and the time. A means for determining an uncertainty of the location, wherein the uncertainty indicates a difference between the location and an actual location of the UE at the scheduled location time may include, e.g., the one or more processors 702 with dedicated hardware or implementing executable code or software instructions in memory 704 and/or medium 720 in entity 700, such as the uncertainty module 726, shown in FIG. 7.

At block 808, the entity sends the location and the uncertainty of the location to another entity, e.g., as discussed at stage C of FIG. 6. A means for sending the location and the uncertainty of the location to another entity may include, e.g., the one or more processors 702 with dedicated hardware or implementing executable code or software instructions in memory 704 and/or medium 720 in entity 700, such as the report module 728, shown in FIG. 7.

In one implementation, the uncertainty of the location may comprise a combination of a first location uncertainty for the location, where the first location uncertainty is based on the location measurements but not based on the scheduled location time, and a second location uncertainty, where the second location uncertainty is based on the scheduled location time. For example, the entity may determine the uncertainty of the location by determining the first location uncertainty based on an estimate of a difference between the location and an actual location of the UE at one time during the plurality of times (or during the time period), e.g., as discussed at stage 12 of FIG. 6 and FIGS. 4 and 5. The entity may determine the second location uncertainty based on an estimate of a difference between the actual location of the UE at the one time and the actual location of the UE at the scheduled location time, e.g., as discussed at stage 12 of FIG. 6 and FIGS. 4 and 5. The entity may combine the first location uncertainty and the second location uncertainty to determine the uncertainty of the location, e.g., as discussed at stage 12 of FIG. 6 and FIGS. 4 and 5. A means for determining the uncertainty of the location by determining the first location uncertainty based on an estimate of a difference between the location and an actual location of the UE at one time during the plurality of times may include, e.g., the one or more processors 702 with dedicated hardware or implementing executable code or software instructions in memory 704 and/or medium 720 in entity 700, such as the uncertainty module 726, shown in FIG. 7. A means for determining the second location uncertainty based on an estimate of a difference between the actual location of the UE at the one time and the actual location of the UE at the scheduled location time may include, e.g., the one or more processors 702 with dedicated hardware or implementing executable code or software instructions in memory 704 and/or medium 720 in entity 700, such as the uncertainty module 726, shown in FIG. 7. A means for combining the first location uncertainty and the second location uncertainty to determine the uncertainty of the location may include, e.g., the one or more processors 702 with dedicated hardware or implementing executable code or software instructions in memory 704 and/or medium 720 in entity 700, such as the uncertainty module 726, shown in FIG. 7.

In one implementation, the entity may receive a request for the location for the UE from the another entity, the request comprising a required uncertainty for the location for the UE, the required uncertainty comprising a maximum difference between the location and the actual location of the UE at the scheduled location time, e.g., as discussed at stage A of FIG. 6. The entity may determine the location for the UE, wherein the uncertainty of the location does not exceed the required uncertainty, e.g., as discussed at stage 12 of FIG. 6. A means for receiving a request for the location for the UE from the another entity, the request comprising a required uncertainty for the location for the UE, the required uncertainty comprising a maximum difference between the location and the actual location of the UE at the scheduled location time may include, e.g., the one or more processors 702 with dedicated hardware or implementing executable code or software instructions in memory 704 and/or medium 720 in entity 700, such as the positioning module 724, shown in FIG. 7. A means for determining the location for the UE, wherein the uncertainty of the location does not exceed the required uncertainty may include, e.g., the one or more processors 702 with dedicated hardware or implementing executable code or software instructions in memory 704 and/or medium 720 in entity 700, such as the positioning module 724, shown in FIG. 7.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

In view of this description embodiments may include different combinations of features. Implementation examples are described in the following numbered clauses:

Clause 1. A method at an entity for locating a user equipment (UE) at a scheduled location time, comprising: receiving location measurements for the UE from one or more other entities, the location measurements obtained by the one or more other entities at a plurality of times within a time period that includes the scheduled location time; determining a location for the UE based on the location measurements; determining an uncertainty of the location, wherein the uncertainty indicates a difference between the location and an actual location of the UE at the scheduled location time; and sending the location and the uncertainty of the location to another entity.

Clause 2. The method of clause 1, wherein the entity is the UE, a Location Management Function (LMF), a Secure User Plane Location (SUPL) Location Platform (SLP), a New Radio Node B (gNB), a Location Server Surrogate (LSS), or a Location Management Component (LMC).

Clause 3. The method of either of clauses 1 or 2, wherein, the one or more other entities include at least one of the UE, a serving gNB, or neighboring gNBs.

Clause 4. The method of any of clauses 1-3, wherein the location measurements include at least one of a Global Navigation Satellite System (GNSS) pseudorange; a GNSS code phase; a GNSS carrier phase; a WiFi (also referred to as Wi-Fi) measurement comprising received signal strength indication (RSSI), angle of arrival (AOA), or round trip time (RTT); a Bluetooth measurement comprising RSSI, AOA or RTT; a measurement of downlink (DL) New Radio (NR) signals from an NR Node B (gNB) comprising reference signal time difference (RSTD), reference signal received power (RSRP), reference signal received quality (RSRQ), angle of departure (AOD), AOA, or receive time-transmission time difference (Rx-Tx); a measurement of uplink (UL) NR signals from the UE comprising AOA, RSRP, Rx-Tx, time of arrival (TOA); and a measurement performed by a sensor comprising an inertial sensor or a barometer.

Clause 5. The method of any of clauses 1-4, wherein the time period is less than 1 second, less than 100 milliseconds (ms), less than 10 ms or less than 1 ms.

Clause 6. The method of any of clauses 1-5, wherein the location for the UE is an estimate of the actual location of the UE at a time within the time period.

Clause 7. The method of clause 6, wherein the uncertainty of the location indicates an error in the estimate of the actual location of the UE at the time combined with an error in an estimate of a distance moved by the UE between the scheduled location time and the time.

Clause 8. The method of any of clauses 1-7, wherein the uncertainty of the location comprises a combination of a first location uncertainty for the location, the first location uncertainty based on the location measurements but not based on the scheduled location time, and a second location uncertainty, the second location uncertainty based on the scheduled location time.

Clause 9. The method of clause 8, wherein determining the uncertainty of the location comprises: determining the first location uncertainty based on an estimate of a difference between the location and an actual location of the UE at one time during the plurality of times; determining the second location uncertainty based on an estimate of a difference between the actual location of the UE at the one time and the actual location of the UE at the scheduled location time; and combining the first location uncertainty and the second location uncertainty to determine the uncertainty of the location.

Clause 10. The method any of clauses 1-9, further comprising: receiving a request for the location for the UE from the another entity, the request comprising a required uncertainty for the location for the UE, the required uncertainty comprising a maximum difference between the location and the actual location of the UE at the scheduled location time; and determining the location for the UE, wherein the uncertainty of the location does not exceed the required uncertainty.

Clause 11. An entity in a wireless network configured for locating a user equipment (UE) at a scheduled location time, comprising: an external interface configured to communicate with other entities in the wireless network; at least one memory; and at least one processor coupled to the external interface and the at least one memory and configured to: receive location measurements for the UE from one or more other entities, the location measurements obtained by the one or more other entities at a plurality of times within a time period that includes the scheduled location time; determine a location for the UE based on the location measurements; determine an uncertainty of the location, wherein the uncertainty indicates a difference between the location and an actual location of the UE at the scheduled location time; and send the location and the uncertainty of the location to another entity.

Clause 12. The entity of clause 11, wherein the entity is the UE, a Location Management Function (LMF), a Secure User Plane Location (SUPL) Location Platform (SLP), a New Radio Node B (gNB), a Location Server Surrogate (LSS), or a Location Management Component (LMC).

Clause 13. The entity of either of clauses 11 or 12, wherein, the one or more other entities include at least one of the UE, a serving gNB, or neighboring gNBs.

Clause 14. The entity of any of clauses 11-13, wherein the location measurements include at least one of a Global Navigation Satellite System (GNSS) pseudorange; a GNSS code phase; a GNSS carrier phase; a WiFi measurement comprising received signal strength indication (RSSI), angle of arrival (AOA), or round trip time (RTT); a Bluetooth measurement comprising RSSI, AOA or RTT; a measurement of downlink (DL) New Radio (NR) signals from an NR Node B (gNB) comprising reference signal time difference (RSTD), reference signal received power (RSRP), reference signal received quality (RSRQ), angle of departure (AOD), AOA, or receive time-transmission time difference (Rx-Tx); a measurement of uplink (UL) NR signals from the UE comprising AOA, RSRP, Rx-Tx, time of arrival (TOA); and a measurement performed by a sensor comprising an inertial sensor or a barometer.

Clause 15. The entity of any of clauses 11-14, wherein the time period is less than 1 second, less than 100 milliseconds (ms), less than 10 ms or less than 1 ms.

Clause 16. The entity of any of clauses 11-15, wherein the location for the UE is an estimate of the actual location of the UE at a time within the time period.

Clause 17. The entity of clause 16, wherein the uncertainty of the location indicates an error in the estimate of the actual location of the UE at the time combined with an error in an estimate of a distance moved by the UE between the scheduled location time and the time.

Clause 18. The entity of any of clauses 11-17, wherein the uncertainty of the location comprises a combination of a first location uncertainty for the location, the first location uncertainty based on the location measurements but not based on the scheduled location time, and a second location uncertainty, the second location uncertainty based on the scheduled location time.

Clause 19. The entity of clause 18, wherein the at least one processor is configured to determine the uncertainty of the location by being configured to: determine the first location uncertainty based on an estimate of a difference between the location and an actual location of the UE at one time during the plurality of times; determine the second location uncertainty based on an estimate of a difference between the actual location of the UE at the one time and the actual location of the UE at the scheduled location time; and combine the first location uncertainty and the second location uncertainty to determine the uncertainty of the location.

Clause 20. The entity of any of clauses 11-19, wherein the at least one processor is further configured to: receive a request for the location for the UE from the another entity, the request comprising a required uncertainty for the location for the UE, the required uncertainty comprising a maximum difference between the location and the actual location of the UE at the scheduled location time; and determine the location for the UE, wherein the uncertainty of the location does not exceed the required uncertainty.

Clause 21. An entity in a wireless network configured for locating a user equipment (UE) at a scheduled location time, comprising: means for receiving location measurements for the UE from one or more other entities, the location measurements obtained by the one or more other entities at a plurality of times within a time period that includes the scheduled location time; means for determining a location for the UE based on the location measurements; means for determining an uncertainty of the location, wherein the uncertainty indicates a difference between the location and an actual location of the UE at the scheduled location time; and means for sending the location and the uncertainty of the location to another entity.

Clause 22. The entity of clause 21, wherein the entity is the UE, a Location Management Function (LMF), a Secure User Plane Location (SUPL) Location Platform (SLP), a New Radio Node B (gNB), a Location Server Surrogate (LSS), or a Location Management Component (LMC).

Clause 23. The entity of either of clauses 21 or 22, wherein, the one or more other entities include at least one of the UE, a serving gNB, or neighboring gNBs.

Clause 24. The entity of any of clauses 21-23, wherein the location measurements include at least one of a Global Navigation Satellite System (GNSS) pseudorange; a GNSS code phase; a GNSS carrier phase; a WiFi measurement comprising received signal strength indication (RSSI), angle of arrival (AOA), or round trip time (RTT); a Bluetooth measurement comprising RSSI, AOA or RTT; a measurement of downlink (DL) New Radio (NR) signals from an NR Node B (gNB) comprising reference signal time difference (RSTD), reference signal received power (RSRP), reference signal received quality (RSRQ), angle of departure (AOD), AOA, or receive time-transmission time difference (Rx-Tx); a measurement of uplink (UL) NR signals from the UE comprising AOA, RSRP, Rx-Tx, time of arrival (TOA); and a measurement performed by a sensor comprising an inertial sensor or a barometer.

Clause 25. The entity of any of clauses 21-24, wherein the time period is less than 1 second, less than 100 milliseconds (ms), less than 10 ms or less than 1 ms.

Clause 26. The entity of any of clauses 21-25, wherein the location for the UE is an estimate of the actual location of the UE at a time within the time period.

Clause 27. The entity of clause 26, wherein the uncertainty of the location indicates an error in the estimate of the actual location of the UE at the time combined with an error in an estimate of a distance moved by the UE between the scheduled location time and the time.

Clause 28. The entity of any of clauses 21-27, wherein the uncertainty of the location comprises a combination of a first location uncertainty for the location, the first location uncertainty based on the location measurements but not based on the scheduled location time, and a second location uncertainty, the second location uncertainty based on the scheduled location time.

Clause 29. The entity of clause 28, wherein the means for determining the uncertainty of the location comprises: means for determining the first location uncertainty based on an estimate of a difference between the location and an actual location of the UE at one time during the plurality of times; means for determining the second location uncertainty based on an estimate of a difference between the actual location of the UE at the one time and the actual location of the UE at the scheduled location time; and means for combining the first location uncertainty and the second location uncertainty to determine the uncertainty of the location.

Clause 30. The entity of any of clauses 21-29, further comprising: means for receiving a request for the location for the UE from the another entity, the request comprising a required uncertainty for the location for the UE, the required uncertainty comprising a maximum difference between the location and the actual location of the UE at the scheduled location time; and means for determining the location for the UE, wherein the uncertainty of the location does not exceed the required uncertainty.

Clause 31. A non-transitory storage medium including program code stored thereon, the program code is operable to configure at least one processor in an entity in a wireless network for locating a user equipment (UE) at a scheduled location time, the program code comprising instructions to: receive location measurements for the UE from one or more other entities, the location measurements obtained by the one or more other entities at a plurality of times within a time period that includes the scheduled location time; determine a location for the UE based on the location measurements; determine an uncertainty of the location, wherein the uncertainty indicates a difference between the location and an actual location of the UE at the scheduled location time; and send the location and the uncertainty of the location to another entity.

Clause 32. The non-transitory storage medium of clause 31, wherein the entity is the UE, a Location Management Function (LMF), a Secure User Plane Location (SUPL) Location Platform (SLP), a New Radio Node B (gNB), a Location Server Surrogate (LSS), or a Location Management Component (LMC).

Clause 33. The non-transitory storage medium of either of clauses 31 or 32, wherein, the one or more other entities include at least one of the UE, a serving gNB, or neighboring gNBs.

Clause 34. The non-transitory storage medium of any of clauses 31-33, wherein the location measurements include at least one of a Global Navigation Satellite System (GNSS) pseudorange; a GNSS code phase; a GNSS carrier phase; a WiFi measurement comprising received signal strength indication (RSSI), angle of arrival (AOA), or round trip time (RTT); a Bluetooth measurement comprising RSSI, AOA or RTT; a measurement of downlink (DL) New Radio (NR) signals from an NR Node B (gNB) comprising reference signal time difference (RSTD), reference signal received power (RSRP), reference signal received quality (RSRQ), angle of departure (AOD), AOA, or receive time-transmission time difference (Rx-Tx); a measurement of uplink (UL) NR signals from the UE comprising AOA, RSRP, Rx-Tx, time of arrival (TOA); and a measurement performed by a sensor comprising an inertial sensor or a barometer.

Clause 35. The non-transitory storage medium of any of clauses 31-34, wherein the time period is less than 1 second, less than 100 milliseconds (ms), less than 10 ms or less than 1 ms.

Clause 36. The non-transitory storage medium of any of clauses 31-35, wherein the location for the UE is an estimate of the actual location of the UE at a time within the time period.

Clause 37. The non-transitory storage medium of clause 36, wherein the uncertainty of the location indicates an error in the estimate of the actual location of the UE at the time combined with an error in an estimate of a distance moved by the UE between the scheduled location time and the time.

Clause 38. The non-transitory storage medium of any of clauses 31-37, wherein the uncertainty of the location comprises a combination of a first location uncertainty for the location, the first location uncertainty based on the location measurements but not based on the scheduled location time, and a second location uncertainty, the second location uncertainty based on the scheduled location time.

Clause 39. The non-transitory storage medium of clause 38, wherein the instructions to determine the uncertainty of the location comprises instructions to: determine the first location uncertainty based on an estimate of a difference between the location and an actual location of the UE at one time during the plurality of times; determine the second location uncertainty based on an estimate of a difference between the actual location of the UE at the one time and the actual location of the UE at the scheduled location time; and combine the first location uncertainty and the second location uncertainty to determine the uncertainty of the location.

Clause 40. The non-transitory storage medium of any of clauses 31-39, wherein the program code further comprises instructions to: receive a request for the location for the UE from the another entity, the request comprising a required uncertainty for the location for the UE, the required uncertainty comprising a maximum difference between the location and the actual location of the UE at the scheduled location time; and determine the location for the UE, wherein the uncertainty of the location does not exceed the required uncertainty.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method at an entity for locating a user equipment (UE) at a scheduled location time, comprising:
   receiving location measurements for the UE from one or more other entities, the location measurements being obtained by the one or more other entities at a plurality of times within a time period that includes the scheduled location time;
   determining an estimated location for the UE based on the location measurements obtained within the time period;
   determining an uncertainty of the estimated location, wherein the uncertainty indicates a difference between the estimated location and the actual location of the UE at the scheduled location time, and wherein the uncertainty of the estimated location comprises a combination of a first location uncertainty for the estimated location, the first location uncertainty being based on the location measurements but not being based on the scheduled location time, and a second location uncertainty, the second location uncertainty based on the scheduled location time; and
   sending the estimated location and the uncertainty of the estimated location to another entity.

2. The method of claim 1, wherein the entity is the UE, a Location Management Function (LMF), a Secure User Plane Location (SUPL) Location Platform (SLP), a New Radio Node B (gNB), a Location Server Surrogate (LSS), or a Location Management Component (LMC).

3. The method of claim 1, wherein the one or more other entities include at least one of the UE, a serving gNB, or neighboring gNBs.

4. The method of claim 1, wherein the location measurements include at least one of a Global Navigation Satellite System (GNSS) pseudorange; a GNSS code phase; a GNSS carrier phase; a WiFi measurement comprising received signal strength indication (RSSI), angle of arrival (AOA), or round trip time (RTT); a Bluetooth measurement comprising RSSI, AOA or RTT; a measurement of downlink (DL) New Radio (NR) signals from an NR Node B (gNB) comprising reference signal time difference (RSTD), reference signal received power (RSRP), reference signal received quality (RSRQ), angle of departure (AOD), AOA, or receive time-transmission time difference (Rx-Tx); a measurement of uplink (UL) NR signals from the UE comprising AOA, RSRP, Rx-Tx, time of arrival (TOA); and a measurement performed by a sensor comprising an inertial sensor or a barometer.

5. The method of claim 1, wherein the time period is less than 1 second, less than 100 milliseconds (ms), less than 10 ms or less than 1 ms.

6. The method of claim 1, wherein the estimated location for the UE is an estimate of the actual location of the UE at a time within the time period.

7. The method of claim 6, wherein the uncertainty of the estimated location indicates an error in the estimate of the actual location of the UE at the time combined with an error based on an estimate of a distance moved by the UE between the scheduled location time and the time.

8. The method of claim 1, wherein determining the uncertainty of the estimated location comprises:
   determining the first location uncertainty based on an estimate of a difference between the estimated location and an actual location of the UE at one time during the plurality of times;
   determining the second location uncertainty based on an estimate of a difference between the actual location of the UE at the one time and the actual location of the UE at the scheduled location time; and
   combining the first location uncertainty and the second location uncertainty to determine the uncertainty of the location.

9. The method of claim 1, further comprising:
   receiving a request for the estimated location for the UE from the another entity, the request comprising a required uncertainty for the estimated location for the UE, the required uncertainty comprising a maximum difference between the estimated location and the actual location of the UE at the scheduled location time; and
   determining the estimated location for the UE, wherein the uncertainty of the estimated location does not exceed the required uncertainty.

10. An entity in a wireless network configured for locating a user equipment (UE) at a scheduled location time, comprising:
   an external interface configured to communicate with other entities in the wireless network;
   at least one memory; and
   at least one processor coupled to the external interface and the at least one memory and configured to:
      receive location measurements for the UE from one or more other entities, the location measurements being obtained by the one or more other entities at a plurality of times within a time period that includes the scheduled location time;
      determine an estimated location for the UE based on the location measurements obtained within the time period;
      determine an uncertainty of the estimated location, wherein the uncertainty indicates a difference between the estimated location and the actual location of the UE at the scheduled location time, and wherein the uncertainty of the estimated location comprises a combination of a first location uncertainty for the estimated location, the first location uncertainty being based on the location measurements but not being based on the scheduled location time, and a second location uncertainty, the second location uncertainty based on the scheduled location time; and
      send the estimated location and the uncertainty of the estimated location to another entity.

11. The entity of claim 10, wherein the entity is the UE, a Location Management Function (LMF), a Secure User Plane Location (SUPL) Location Platform (SLP), a New Radio Node B (gNB), a Location Server Surrogate (LSS), or a Location Management Component (LMC).

12. The entity of claim 10, wherein the one or more other entities include at least one of the UE, a serving gNB, or neighboring gNBs.

13. The entity of claim 10, wherein the location measurements include at least one of a Global Navigation Satellite System (GNSS) pseudorange; a GNSS code phase; a GNSS carrier phase; a WiFi measurement comprising received signal strength indication (RSSI), angle of arrival (AOA), or round trip time (RTT); a Bluetooth measurement comprising RSSI, AOA or RTT; a measurement of downlink (DL) New Radio (NR) signals from an NR Node B (gNB) comprising reference signal time difference (RSTD), reference signal received power (RSRP), reference signal received quality (RSRQ), angle of departure (AOD), AOA, or receive time-transmission time difference (Rx-Tx); a measurement of uplink (UL) NR signals from the UE comprising AOA, RSRP, Rx-Tx, time of arrival (TOA); and a measurement performed by a sensor comprising an inertial sensor or a barometer.

14. The entity of claim 10, wherein the time period is less than 1 second, less than 100 milliseconds (ms), less than 10 ms or less than 1 ms.

15. The entity of claim 10, wherein the estimated location for the UE is an estimate of the actual location of the UE at a time within the time period.

16. The entity of claim 15, wherein the uncertainty of the estimated location indicates an error in the estimate of the actual location of the UE at the time combined with an error based on an estimate of a distance moved by the UE between the scheduled location time and the time.

17. The entity of claim 10, wherein the at least one processor is configured to determine the uncertainty of the estimated location by being configured to:
   determine the first location uncertainty based on an estimate of a difference between the estimated location and an actual location of the UE at one time during the plurality of times;
   determine the second location uncertainty based on an estimate of a difference between the actual location of the UE at the one time and the actual location of the UE at the scheduled location time; and
   combine the first location uncertainty and the second location uncertainty to determine the uncertainty of the location.

18. The entity of claim 10, wherein the at least one processor is further configured to:
   receive a request for the estimated location for the UE from the another entity, the request comprising a required uncertainty for the location for the UE, the required uncertainty comprising a maximum difference between the estimated location and the actual location of the UE at the scheduled location time; and
   determine the estimated location for the UE, wherein the uncertainty of the estimated location does not exceed the required uncertainty.

19. An entity in a wireless network configured for locating a user equipment (UE) at a scheduled location time, comprising:
   means for receiving location measurements for the UE from one or more other entities, the location measurements being obtained by the one or more other entities at a plurality of times within a time period that includes the scheduled location time;

means for determining an estimated location for the UE based on the location measurements obtained within the time period;

means for determining an uncertainty of the estimated location, wherein the uncertainty indicates a difference between the estimated location and the actual location of the UE at the scheduled location time, and wherein the uncertainty of the estimated location comprises a combination of a first location uncertainty for the estimated location, the first location uncertainty being based on the location measurements but not being based on the scheduled location time, and a second location uncertainty, the second location uncertainty based on the scheduled location time; and means for sending the estimated location and the uncertainty of the estimated location to another entity.

20. The entity of claim 19, wherein the location measurements include at least one of a Global Navigation Satellite System (GNSS) pseudorange; a GNSS code phase; a GNSS carrier phase; a WiFi measurement comprising received signal strength indication (RSSI), angle of arrival (AOA), or round trip time (RTT); a Bluetooth measurement comprising RSSI, AOA or RTT; a measurement of downlink (DL) New Radio (NR) signals from an NR Node B (gNB) comprising reference signal time difference (RSTD), reference signal received power (RSRP), reference signal received quality (RSRQ), angle of departure (AOD), AOA, or receive time-transmission time difference (Rx-Tx); a measurement of uplink (UL) NR signals from the UE comprising AOA, RSRP, Rx-Tx, time of arrival (TOA); and a measurement performed by a sensor comprising an inertial sensor or a barometer.

21. The entity of claim 19, wherein the estimated location for the UE is an estimate of the actual location of the UE at a time within the time period.

22. The entity of claim 19, further comprising:
means for receiving a request for the estimated location for the UE from the another entity, the request comprising a required uncertainty for the estimated location for the UE, the required uncertainty comprising a maximum difference between the estimated location and the actual location of the UE at the scheduled location time; and means for determining the estimated location for the UE, wherein the uncertainty of the estimated location does not exceed the required uncertainty.

23. The entity of claim 19, wherein the entity is the UE, a Location Management Function (LMF), a Secure User Plane Location (SUPL) Location Platform (SLP), a New Radio Node B (gNB), a Location Server Surrogate (LSS), or a Location Management Component (LMC).

24. The entity of claim 19, wherein the one or more other entities include at least one of the UE, a serving gNB, or neighboring gNBs.

25. The entity of claim 19, wherein the time period is less than 1 second, less than 100 milliseconds (ms), less than 10 ms or less than 1 ms.

26. A non-transitory storage medium including program code stored thereon, the program code is operable to configure at least one processor in an entity in a wireless network for locating a user equipment (UE) at a scheduled location time, the program code comprising instructions to:
receive location measurements for the UE from one or more other entities, the location measurements obtained by the one or more other entities at a plurality of times within a time period that includes the scheduled location time;

determine an estimated location for the UE based on the location measurements obtained within the time period;

determine an uncertainty of the estimated location, wherein the uncertainty indicates a difference between the estimated location and the actual location of the UE at the scheduled location time, and wherein the uncertainty of the estimated location comprises a combination of a first location uncertainty for the estimated location, the first location uncertainty being based on the location measurements but not being based on the scheduled location time, and a second location uncertainty, the second location uncertainty based on the scheduled location time; and send the estimated location and the uncertainty of the estimated location to another entity.

27. The non-transitory storage medium of claim 26, wherein the location measurements include at least one of a Global Navigation Satellite System (GNSS) pseudorange; a GNSS code phase; a GNSS carrier phase; a WiFi measurement comprising received signal strength indication (RSSI), angle of arrival (AOA), or round trip time (RTT); a Bluetooth measurement comprising RSSI, AOA or RTT; a measurement of downlink (DL) New Radio (NR) signals from an NR Node B (gNB) comprising reference signal time difference (RSTD), reference signal received power (RSRP), reference signal received quality (RSRQ), angle of departure (AOD), AOA, or receive time-transmission time difference (Rx-Tx); a measurement of uplink (UL) NR signals from the UE comprising AOA, RSRP, Rx-Tx, time of arrival (TOA); and a measurement performed by a sensor comprising an inertial sensor or a barometer.

28. The non-transitory storage medium of claim 26, wherein the estimated location for the UE is an estimate of the actual location of the UE at a time within the time period.

29. The non-transitory storage medium of claim 26, wherein the program code further comprises instructions to:
receive a request for the estimated location for the UE from the another entity, the request comprising a required uncertainty for the estimated location for the UE, the required uncertainty comprising a maximum difference between the estimated location and the actual location of the UE at the scheduled location time; and determine the estimated location for the UE, wherein the uncertainty of the estimated location does not exceed the required uncertainty.

\* \* \* \* \*